United States Patent
Stefan et al.

(10) Patent No.: US 7,599,537 B1
(45) Date of Patent: Oct. 6, 2009

(54) METHOD FOR DETERMINING A SUBJECT'S DEGREE OF ADIPOSITY

(75) Inventors: David B. Stefan, Chesapeake, VA (US); David A. Gilbert, Virginia Beach, VA (US)

(73) Assignee: Novaptus Systems, Incorporated, Chesapeake, VA (US)

( * ) Notice: Subject to any disclaimer, the term of this patent is extended or adjusted under 35 U.S.C. 154(b) by 685 days.

(21) Appl. No.: 11/213,521

(22) Filed: Aug. 26, 2005

(51) Int. Cl.
*G06K 9/00* (2006.01)
(52) U.S. Cl. .................................... 382/128
(58) Field of Classification Search ................ 382/100, 382/128–134; 128/920–930; 250/455–465; 356/39–49; 600/407–480
See application file for complete search history.

(56) References Cited

U.S. PATENT DOCUMENTS

2004/0131227 A1* 7/2004 Bravomalo et al. ......... 382/100

OTHER PUBLICATIONS

Estella M. Geraghty, John M. Boone, "Determination of Height, Weight, Body Mass Index, and Body Surface Area with a Single Abdominal CT Image", Sep. 2003, From the Department of Radiology, University of California Davis Medical Center, vol. 228: No. 3, pp. 857-863.*
Chan YL, "Body fat estimation in children by magnetic resonance imaging, bioelectrical impedance, skinfold and body mass index: A pilot study", 1998, Journal of Pediatrics and Child Health, vol. 34, Issue 1, pp. 22-28.*

* cited by examiner

*Primary Examiner*—Samir A. Ahmed
*Assistant Examiner*—Atiba O Fitzpatrick
(74) *Attorney, Agent, or Firm*—Bowman Green Hampton & Kelly, PLLC

(57) ABSTRACT

A method for determining a subject's Barix, comprising receiving a scanned image of a subject's body, defining the torso portion of the scanned image, calculating the torso height, the torso surface area, and the torso volume of the torso portion, and applying a mathematical formula to the torso height, torso surface area, and torso volume calculations to produce a Barix calculation.

11 Claims, 20 Drawing Sheets

410

Torso Front View    Torso Back View    Torso Side View

Pre-operative Scan Image         3-Month Post-op Scan Image

Pre-operative Scan Image        3-Month Post-op Scan Image

US 7,599,537 B1

METHOD FOR DETERMINING A SUBJECT'S DEGREE OF ADIPOSITY

BACKGROUND OF THE INVENTION

1. Field of the Invention

This invention relates generally to systems and methods for determining the degree of adiposity of a subject. In particular, the present invention relates to virtual systems and methods for determining the degree of adiposity of a subject.

2. Summary of the Invention

This invention relates generally to systems and methods for determining the degree of adiposity of a subject. In particular, the present invention relates to virtual systems and methods for determining the degree of adiposity of a subject using the shape of the torso as a proxy for the overall shape of the body.

Known methods for determining the degree of adiposity of a subject, or the level of fat deposits in a subject's tissue, have proven to yield inconsistencies. For instance, a traditional indicator, such as the Body Mass Index, can often lead to a false obese categorization of a physically fit athlete.

Key circumferential measurements are contained within the torso. These measurements include the waist, stomach, hips, chest, seat, abdomen, bust, and neck, among others.

Traditionally, various measurement ratios have been utilized to approximate the general condition of the subject. These measurement ratios, such as waist-to-hip, chest-to-waist, and bust-to-waist do not take into account the subject's surface area or volume. As a specific example, a waist-to-hip ratio of less than 1 is thought to be a good indication of overall shape. Thus with this approach, an obese person with a waist-to-hip ratio of 0.75 is considered to be more ideal than a shapely, well-proportioned figure with a waist-to-hip ratio of 0.80. Other ratios can yield similarly false characterizations.

To reveal the true adiposity of the subject, torso surface area and torso volume calculations are required. It must be noted that there is no direct relationship between volume and surface area. A sheet of paper, for instance, has a large surface area but occupies a correspondingly small volume. For the purpose of this invention, volume is a measure of space that the torso occupies, surface area is the coverage of the space the torso occupies, as if the torso is covered in a polyhedral mesh, split open and flattened on a plane. Torso volume and torso surface area are unique to each subject.

The subject's torso height is then used in the adiposity calculation to normalize each subject's (torso volume)/(torso surface area) product. The result of the adiposity calculation is known as the subject's Barix. The subject's Barix is then compared to the generalized Barix scale or a specialized Barix scale for interpretation.

The systems and methods of this invention are drawn to an improved indicator that objectively establishes the degree of adiposity of a subject. In an illustrative, non-limiting embodiment of this invention, the systems and methods utilize a certain height measurement, a certain surface area measurement, and a certain volume measurement combined in a mathematical formula that produces a dimensionless quantity called the "Barix".

The Barix can be used to assess the overall adiposity of a subject by comparing the subject's Barix to the generalized Barix scale set forth in this invention. In various exemplary, non-limiting embodiment of this invention, the generalized Barix scale is applicable to the adult population. In addition to the generalized Barix scale, specialized Barix scales can be applied to various medical disciplines, including but not limited to categorizing the morbidly obese (a bariatric index), the degree of obesity of a child (a pediatric index), and the elderly as they age (a geriatric index), among others.

In various exemplary embodiments of this invention, changes to a subject's Barix, called the Barix trajectory, and the rate of change of a subject's Barix, can assess the direction of the subject's overall physical condition over a period of time. This can include monitoring post-operative patient recovery or gauging the progress of a diet or exercise regimen.

Accordingly, this invention provides systems and methods, which are capable of evaluating and classifying the degree of adiposity of a subject.

This invention separately provides systems and methods, which can assess the direction of the subject's overall physical condition over a period of time.

This invention separately provides systems and methods, which can be used to monitor post-operative patient recovery or gauge the progress of a diet or exercise regimen.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF AN EXEMPLARY EMBODIMENT

Before describing variations of the present invention in detail, first it is to be understood that this invention is not limited to particular variations set forth and may, of course, vary. Various changes may be made to the invention described and equivalents may be substituted without departing from the true spirit and scope of the invention.

For simplicity and clarification, the design factors and principles of the systems and methods of this invention are explained with reference to various exemplary embodiments of systems and methods of this invention. The basic explanation of the design factors and principles of the systems and methods is applicable for the understanding, design, and operation of the systems and methods of this invention.

Figure 1:
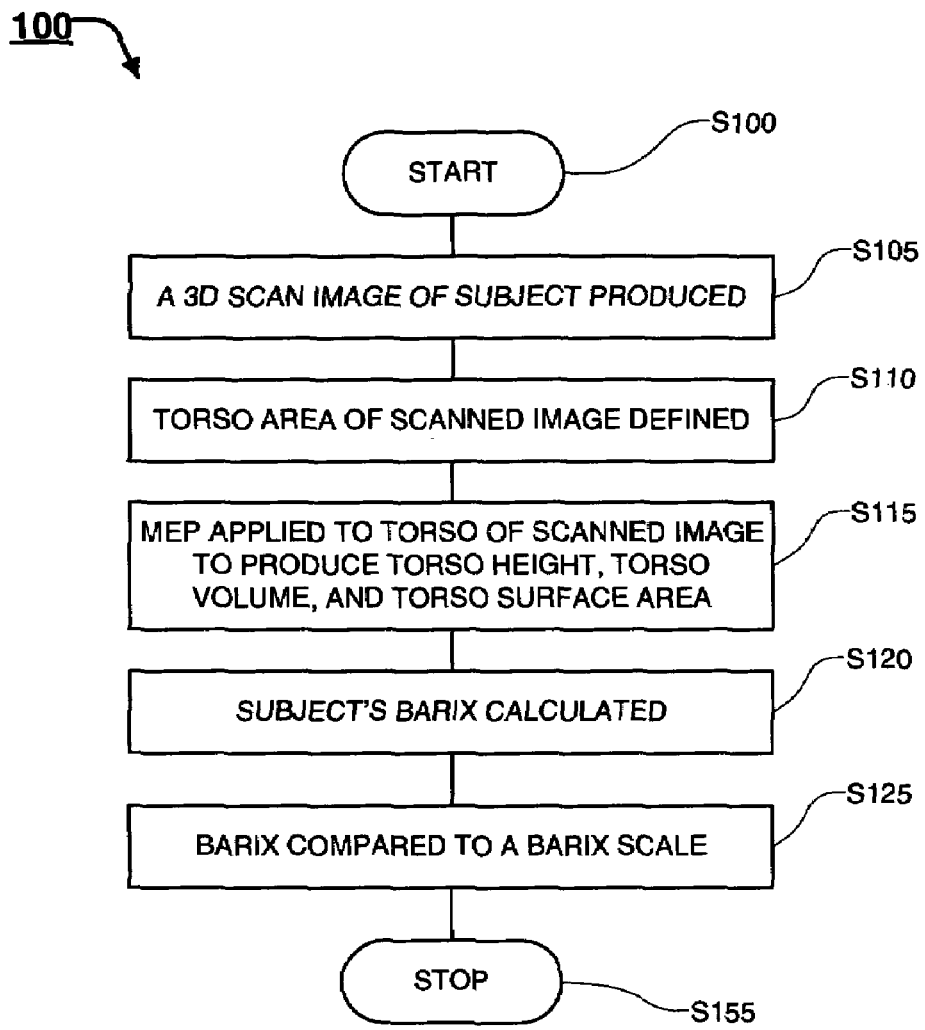
FIG. 1 shows a flowchart outlining an illustrative, non-limiting embodiment of a method for determining a subject's Barix according to this invention

Turning now to FIG. 1, FIG. 1 shows a flowchart 100 outlining one illustrative, non-limiting embodiment of a method for determining a subject's Barix according to this invention.

As shown in FIG. 1, the exemplary method begins in step S100 and continues to Step S105 wherein a subject's body is scanned to produce a highly accurate, dimensionally correct, 3D image of the subject's body. In various exemplary embodiments, a white light scanner is used to produce the scanned image. However, it should be appreciated that in various exemplary embodiments a laser, ultrasonic, low frequency radio wave, magnetic resonance, or other appropriate scanner, capable of providing a highly accurate, dimensionally correct, 3D image of the subject's body may be used.

Then, in Step S110, the torso portion of the subject's scanned image is defined within the scanned image. In various exemplary embodiments, the torso portion of the subject's scanned image is defined as the portion of the body between the base of the neck, excluding the head, and slightly below the buttocks, also known as the crotch point. However, it should be appreciated that in various exemplary embodiments, the torso portion of the subject's scanned image may be defined so as to include or exclude other portions of the subject's body or be defined between different anatomical points, such as, for example, between the subject's shoulder joints to the subject's hip joints.

Next, in step S115, a specialized measurement template, or measurement Extraction Profile (MEP), is applied to the subject's scanned torso. This MEP file contains instructions for determining specific measurements of the subject's scanned torso. The MEP file is used to calculate the torso height, the torso surface area, and the torso volume of the subject's torso.

In various exemplary embodiments, the torso height is measured in centimeters, the torso surface area is calculated in centimeters squared (as discussed below), and the torso volume is calculated in cubic centimeters (as discussed below). When the torso height, the torso surface area, and the torso volume of the subject's torso have been calculated, the method advances to step S120.

In step S120, a mathematical formula is applied to the torso height, torso surface area, and torso volume calculations to produce the Barix calculation for the subject.

The Barix is calculated using the formula:

$$\text{Barix} = \frac{\text{Torso Height}}{(\text{Torso Volume}/\text{Torso Surface Area})}$$

Because the torso height is measured in centimeters, the torso surface area is measured in centimeters squared, and the torso volume is measured in cubic centimeters, the units cancel each other out and the resultant Barix number is dimensionless.

Once the subject's Barix is calculated, the method advances to step S125 and the subject's Barix calculation is optionally compared to a Barix scale. Then, in step S155, the method ends. In general, the Barix scale is a descending scale. Therefore, the lower the Barix number, the more obese the subject.

In various exemplary embodiments, the subject's Barix calculation is compared to a generalized Barix scale. The generalized Barix scale compares the Barix of the subject to a certain, general sample of the adult population. It is contemplated that, in addition to a generalized Barix scale, there will exist several specialized Barix scales. The specialized Barix scales can be applied to various medical disciplines or subject conditions, including but not limited to categorizing the morbidly obese (a bariatric index), the problematically thin (an anorexic index), the degree of obesity of a child (a pediatric index), and the elderly as they age (a geriatric index).

Figure 2:
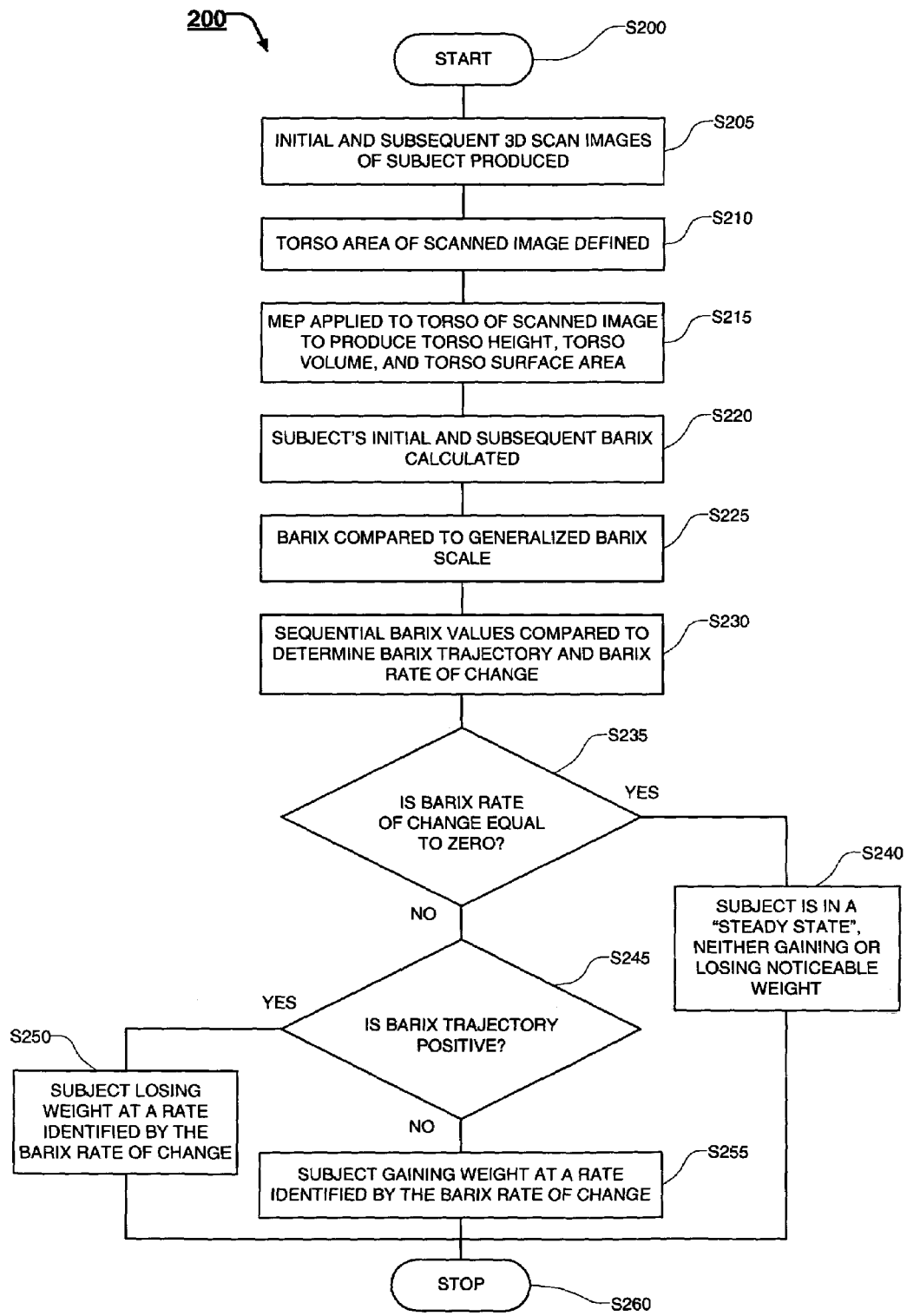
FIG. 2 shows a flowchart outlining an illustrative, non-limiting embodiment of a method for using this invention and the inventive Barix scale to determine whether a subject is losing weight, at a steady state, or gaining weight, according to this invention.

FIG. 2 shows a flowchart 200 outlining an illustrative, non-limiting embodiment of a method for using this invention and the inventive Barix scale to determine whether a subject is losing weight, at a steady state, or gaining weight. As shown in FIG. 2, the exemplary method begins in step S200 and continues to Step S205 wherein a subject's body is initially scanned to produce a highly accurate, dimensionally correct, initial 3D image of the subject's body, as discussed above. In order to determine whether the subject is losing weight, at a steady state, or gaining weight, the subject's body is subsequently scanned to produce at least one subsequent 3D image of the subject's body.

It should be appreciated that a plurality of subsequent scans may be produced. In various exemplary embodiments, the subsequent scans are periodic scans, which are performed at determined, periodic intervals. When at least one initial scan and at least one subsequent scan has been performed, the method advances to step S210.

In Step S210, the torso portion of the subject's initial and subsequent scanned images is defined within each of the scanned images. In various exemplary embodiments, the torso portion of each of the subject's scanned images is defined as the portion of the body between the base of the neck, excluding the head, and slightly below the buttocks, also known as the crotch point. However, it should be appreciated that in various exemplary embodiments, the torso portion of the subject's scanned images may be defined so as to include or exclude other portions of the subject's body or be defined between different anatomical points, such as, for example, between the subject's shoulder joints to the subject's hip joints.

Next, in step S215, a specialized MEP, is applied to the subject's scanned torso images and is used to calculate the torso height, the torso surface area, and the torso volume of the subject's torso, as discussed above, with respect to FIG. 1.

Then in step S220, a mathematical formula is applied to each of the torso height, torso surface area, and torso volume calculations to produce a Barix calculation for each scanned torso image for the subject.

Once the Barix is calculated for the subject's most recent scanned image, the method optionally advances to step S225, and the subject's most recent Barix calculation is optionally compared to a Barix scale. This optional step may be useful in determining, for example, whether the subject's Barix should be compared to a general Barix scale or some specific Barix scale.

Next, in step S230, sequential Barix values for the subject are compared to determine a Barix trajectory and a Barix rate of change. The Barix trajectory and Rate of Change of the Barix are used to interpret changes in a subject's Barix over time.

A subject's Barix will change over time. This can be due to the normal effects of aging, or changes in the subject's lifestyle, such as a new diet or exercise regimen. Such changes to a subject's Barix are measurable. Dramatic changes to a subject's Barix in either a positive or a negative direction may be cause for concern if that subject is not participating in, for example, an exercise program, a severely calorie restricted diet, undergoing a surgical procedure that affects the physical contours of the body, or some other readily determinable factor.

Monitoring changes to a subject's Barix can assist a physician, surgeon, or other healthcare provider in evaluating post-operative recovery. Monitoring changes to a subject's Barix can also assist a fitness or nutrition professional in assessing the progress of a subject's change in lifestyle (diet, exercise, change in stress level, cessation from smoking, etc).

Each subject has their own Barix trajectory. The Barix trajectory is simply the direction or trend that a subject's Barix takes over time. If the subject's Barix is increasing slightly over time (positive), that subject is likely enjoying the results of a new exercise or diet regimen. If the subject's Barix decreases slightly over time (negative), it could indicate the normal aging process or a trend toward gaining weight.

Next, in step S235, it is determined whether the subject's Barix rate of change is approximately zero. If, in step S235, it is determined that the subject's Barix rate of change is approximately zero, the method advances to step S240 and it is concluded that the subject is neither gaining or losing a noticeable amount of weight. When the subject is neither gaining or losing a noticeable amount of weight the subject's body is in a "steady state".

If, in step S235, it is determined that the subject's Barix rate of change is not approximately zero, the method jumps to step S245 and it is determined whether the Barix trajectory is positive. If, in step S245, it is determined that the Barix trajectory is positive, the method advances to step S250 and it is concluded that the subject is losing weight. The rate at which the subject is losing weight is identified by the Barix rate of change. Then, the method jumps to step S260, wherein the method stops.

If, in step S245, it is determined that the Barix trajectory is not positive, the method jumps to step S255 and it is concluded that the subject is gaining weight. The rate at which the subject is gaining weight is identified by the Barix rate of change. Then, in step S260, the method stops.

Figure 3A:
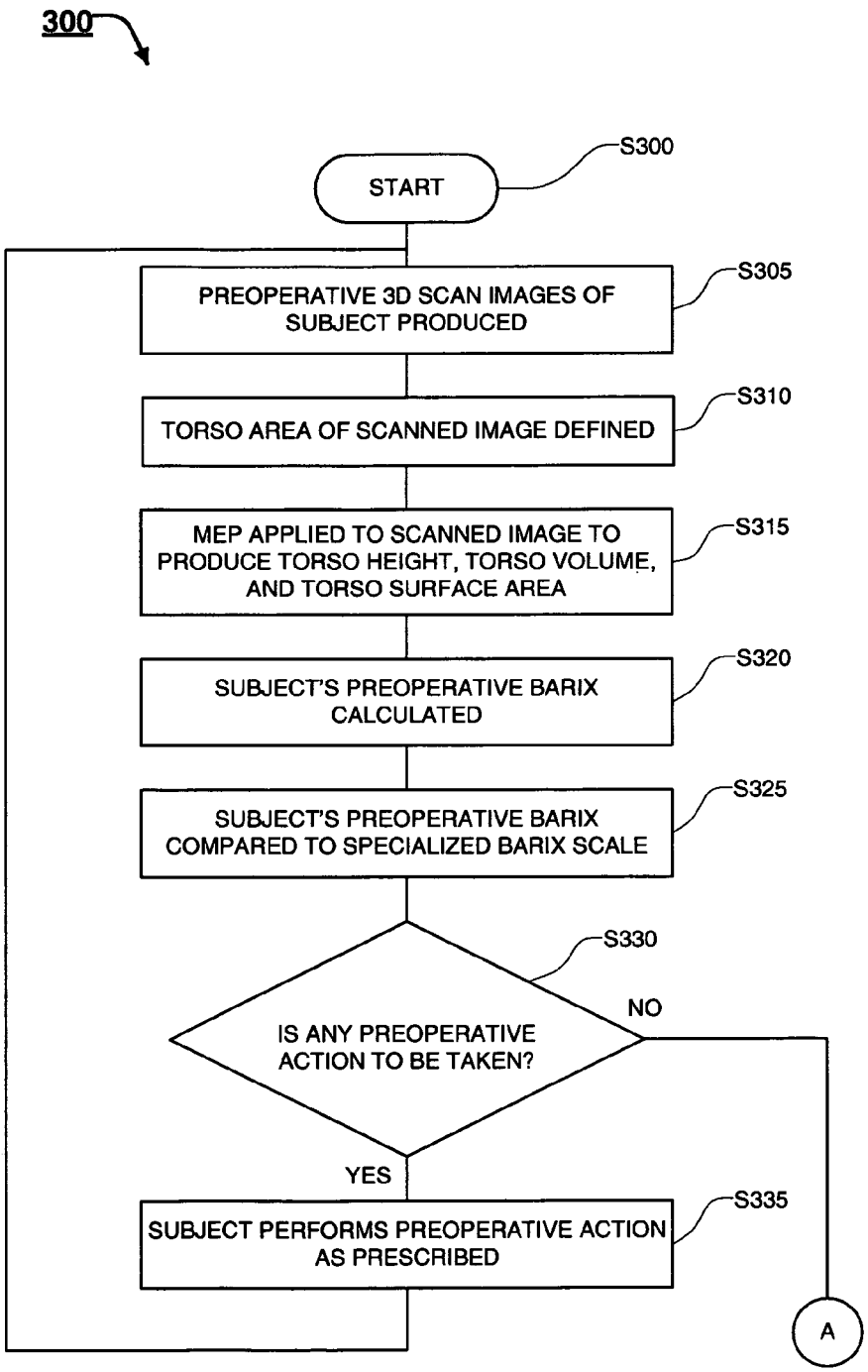
FIGS. 3A and 3B show a flowchart outlining an illustrative, non-limiting embodiment of a method for utilizing a specialized Barix scale to evaluate a pre-operative subject and monitor the subject's post-operative recovery, according to this invention.
Figure 3B:
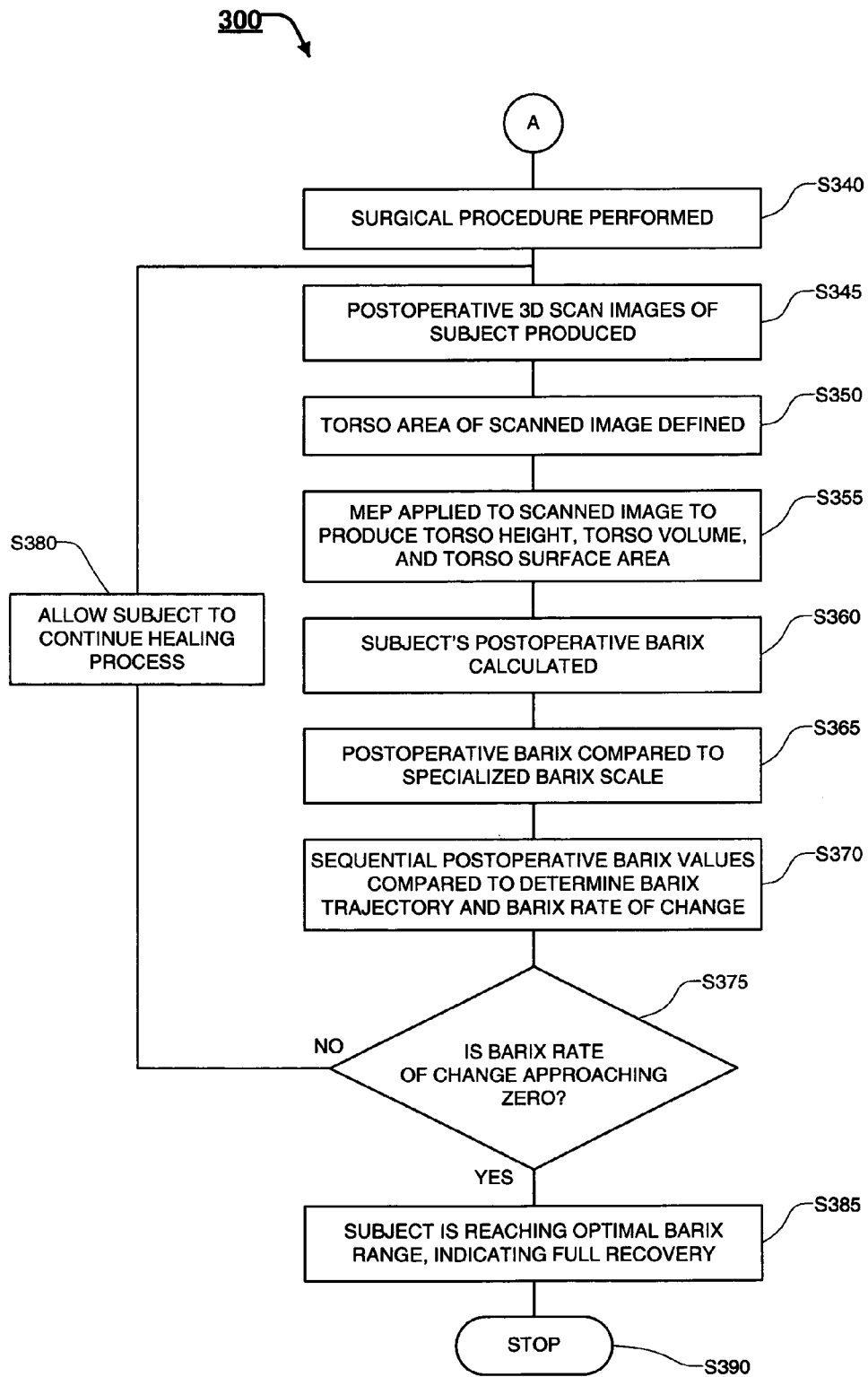

FIGS. 3A and 3B show a flowchart 300 outlining an illustrative, non-limiting embodiment of a method for utilizing a specialized Barix scale to evaluate a pre-operative subject and monitor the subject's post-operative recovery, according to this invention.

As shown in FIGS. 3A and 3B, the exemplary method begins in step S300 and continues to Step S305 wherein a preoperative subject's body is scanned to produce a highly accurate, dimensionally correct, 3D image of the preoperative subject's body.

Then, in step S310, the torso portion of the preoperative subject's scanned image is defined within the preoperative scanned image.

Next, in step S315, a specialized measurement template, or MEP, is applied to the preoperative subject's scanned torso. This MEP file contains instructions for determining specific measurements of the preoperative subject's scanned torso. The MEP file is used to calculate the preoperative torso height, torso surface area, and torso volume of the preoperative subject's torso. When the preoperative torso height, torso surface area, and torso volume have been calculated, the method advances to step S320.

In step S320, a mathematical formula is applied to the preoperative torso height, torso surface area, and torso volume calculations to produce a preoperative Barix calculation for the preoperative subject.

Once the preoperative subject's preoperative Barix is calculated, the method advances to step S325 and the preoperative subject's preoperative Barix calculation is optionally compared to a Barix scale.

It should be appreciated that steps S300 through S325 may be performed as described in greater detail in steps S100 through S125 above, with reference to FIG. 1.

Then, in step S330 a determination is made as to whether the preoperative subject's Barix is such that the subject may not be fit for a surgical procedure and at least some preoperative action should be taken to place the subject in better condition for the surgical procedure.

If, in step S330 it is determined that at least some preoperative action should be taken, the method advances to step S335 and the subject performs the preoperative action as prescribed. For example, a subject's Barix may indicate that the subject is at risk for surgical complications because the subject is overweight. Thus, a surgeon or healthcare provider may demand that the subject follow a calorie restricted diet for a period of time and then be reevaluated for the surgical procedure.

When the subject has performed the prescribed preoperative action, the method returns to step S305, in the preoperative subject begins the process over.

If, in step S330 it is determined that no preoperative action should be taken, the method jumps to step S340 and the surgical procedure is performed. After the surgical procedure has performed, the method advances to step S345.

In step S345, the postoperative subject's body is scanned to produce a highly accurate, dimensionally correct, 3D image of the postoperative subject's body.

Then, in step S350, the torso portion of the postoperative subject's scanned image is defined within the postoperative scanned image.

Next, in step S355, the MEP, is applied to the postoperative subject's scanned torso and is used to calculate the postoperative torso height, torso surface area, and torso volume of the postoperative subject's torso. This MEP file may be the same MEP applied to the preoperative subject's scanned torso or may be a modified or different MEP. When the postoperative torso height, torso surface area, and torso volume have been calculated, the method advances to step S360.

In step S360, the postoperative Barix is calculated for the postoperative subject.

Once the subject's postoperative Barix is calculated, the method advances to step S365 and the subject's postoperative Barix calculation is optionally compared to a Barix scale. It should be appreciated that the subject's postoperative Barix calculation may optionally be compared to a general or a specialized Barix scale.

Then, in step S370, at least two sequential Barix calculations are compared to determine a Barix trajectory and a Barix rate of change for the subject. In various exemplary embodiments, the two sequential Barix calculations may comprise the preoperative Barix calculation in the postoperative Barix calculation for the subject.

Next, in step S375, it is determined whether the subject's Barix rate of change is approaching zero. If, in step S375, it is determined that the subject's Barix rate of change is not approaching zero, the method advances to step S380 and the postoperative subject is allowed to continue the healing process for a determined period of time. When the determined period of time has run, the method returns to step S345 wherein the postoperative subject's body is again scanned to produce a highly accurate, dimensionally correct, 3D image of the postoperative subject's body.

It should be appreciated that if the method returns to step S345, the at least two sequential Barix calculations compared in step S370 may comprise the at least two most recent sequential Barix calculations for the subject. Alternatively, the at least two sequential Barix calculations compared in step S370 may comprise the preoperative Barix calculation, at least one of the preoperative Barix calculations for the subject, and the most recent preoperative Barix calculation for the subject.

If, in step S375, it is determined that the subject's Barix rate of change is approaching zero, the method jumps to step S385 and it is concluded that the postoperative subject is reaching the subject's optimal Barix range. When the subject reaches the optimal Barix range, wherein the postoperative subject's Barix rate of change is approaching zero, the postoperative subject has achieved a state of recovery from the surgical procedure. Then, the method jumps to step S390, wherein the method stops.

FIGS. 4 through 19 illustrate various exemplary embodiments of Barix calculations, creation of a generalized Barix scale, interpretation of exemplary subjects' Barix, and an exemplary statistical analysis of a sample population of subjects whereby the Barix has been produced and ranked and percentiles have been determined and correlations have been made between the Barix, waist measurement, hip measurement, waist-to-hip ratio, and torso height of exemplary subjects.

The first example details the determination of the torso, the torso height value, and an exemplary method whereby the torso surface area and torso volume are calculated. Other Barix calculations are made for a morbidly obese subject, a subject with an endomorphic body type, a subject with a mesomorphic body type, and a subject with an ectomorphic body type.

Figure 4:
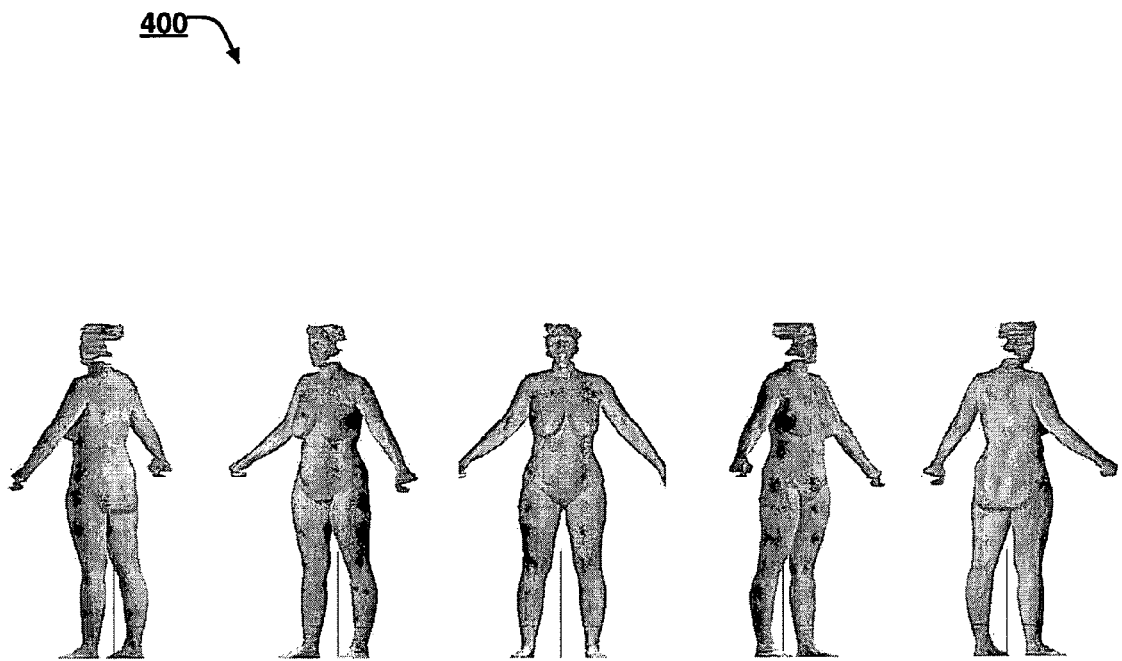
FIG. 4 shows illustrative composite images of an exemplary subject's three-dimensional scan shown in "surface" mode, according to this invention.
Figure 5:
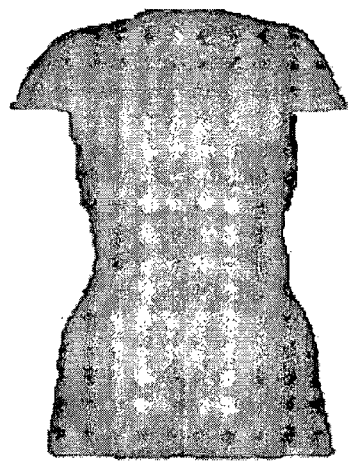
FIG. 5 shows illustrative composite images of an exemplary subject's three-dimensional torso scan shown in "surface" mode, according to this invention.
Figure 5:
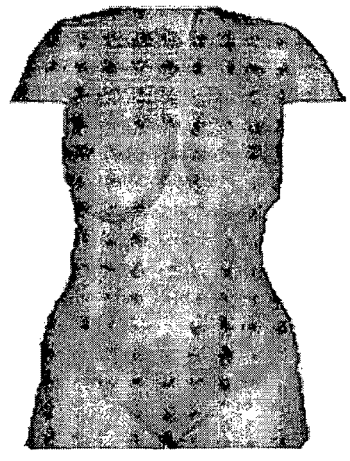
Figure 5:
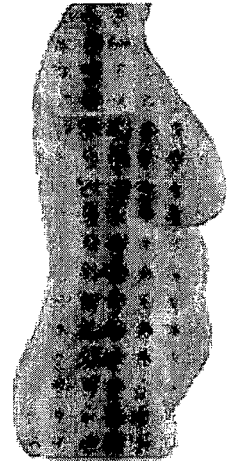
Figure 6:
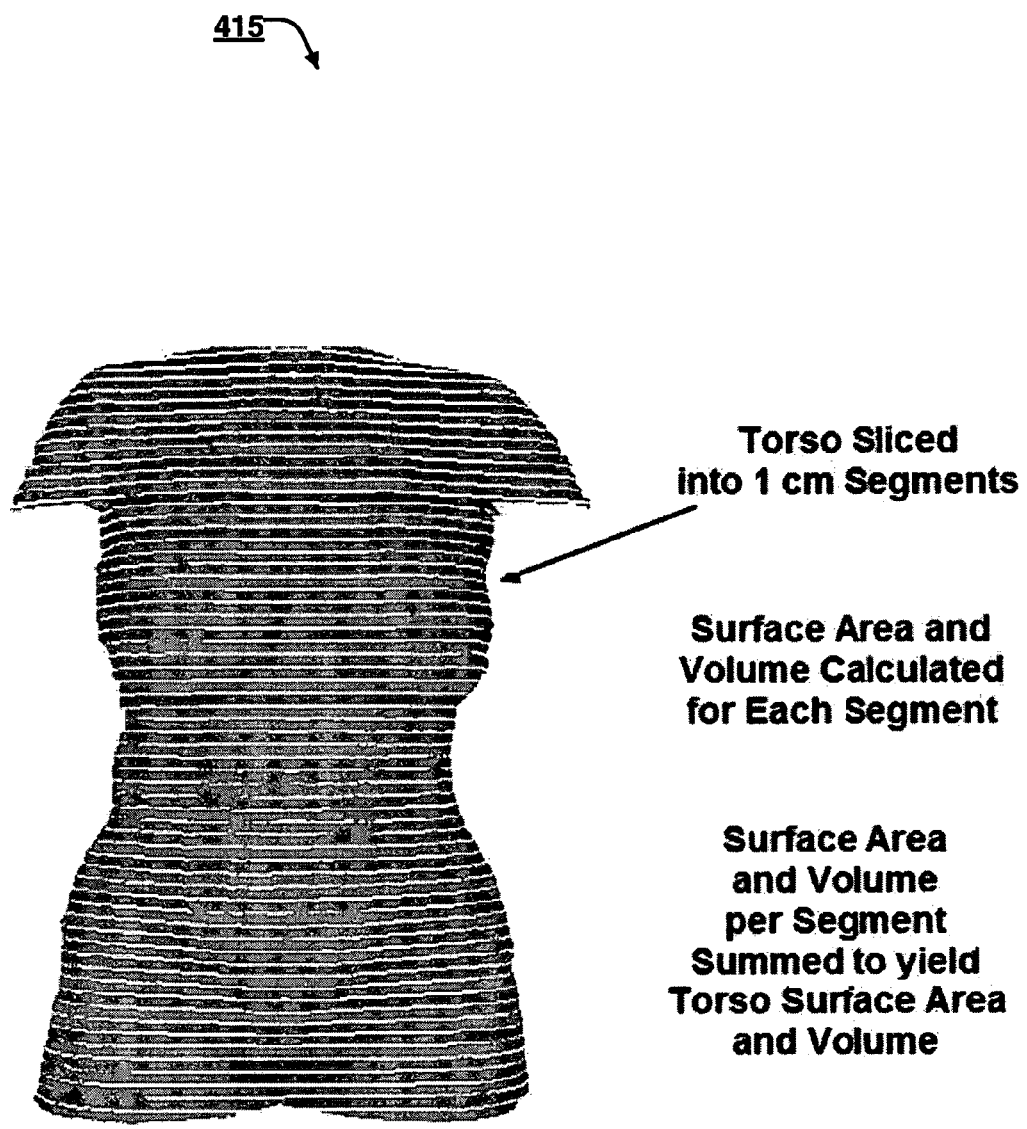
FIG. 6 shows an illustrative composite image of an exemplary subject's three-dimensional torso scan sliced into 1 cm segments, according to this invention.

FIGS. 4 through 6 illustrate an exemplary, non-limiting embodiment of an example of calculating a subject's Barix, according to this invention. Beginning with FIG. 4, FIG. 4 shows illustrative composite images 400 of an exemplary subject's three-dimensional scan shown in a "surface" mode, according to this invention. This scan image was produced by a white light scanner, though other types of technology can be utilized to produce a accurate, three-dimensional, whole body image, as discussed above.

Linear and circumferential measurements as well as measurement height locations can be extracted from any of the images 400 by applying a programmable measurement-specific MEP to the scan image. In this fashion, hip, waist, abdomen, chest, bust, or other measurements can be extracted and documented.

FIG. 5 shows an illustrative composite image of the exemplary subject's three-dimensional torso scan shown in "surface" mode, according to this invention. As shown in FIG. 5, the torso portion 410 of the subject's scanned image has been defined within the scanned image 400, as shown in FIG. 4.

In various exemplary embodiments, the torso portion 410 of the subject's scanned image is defined as the portion of the body between the base of the neck and slightly below the buttocks, also known as the crotch point. Generally, the torso portion 410 excludes the head, arms, hands, leg, and feet. However, it should be appreciated that in various exemplary embodiments, the torso portion 410 of the subject's scanned image may be defined so as to include or exclude other portions of the subject's body or be defined between different anatomical points, such as, for example, between the subject's shoulder joints to the subject's hip joints.

FIG. 6 shows an illustrative composite image of the exemplary subject's three-dimensional torso scan 415 sliced into 1 cm segments, according to this invention. As shown in FIG. 6, the MEP file has been programmed to slice the torso portion 410, as shown in FIG. 5, into 1 cm "segments" and determine the torso height, torso surface area, and torso volume. Each segment is integrated around its surface contour by using a finite triangular summation to calculate the surface area of each segment. Each slice segment is then closed on the top and bottom, treated as a solid, and integrated within to calculate the volume of each segment.

For illustrative purposes, FIG. 6 depicts the torso sliced into 1 cm segments. Note that the torso surface area and volume calculations are made along the contours of the torso.

The MEP file has been programmed to calculate the torso height by locating the back of neck height point and the crotch point as measured from the floor. The output of this MEP consists of the height of the torso segments, along with each segment's surface area and volume.

The overall torso height is calculated by determining the difference, in centimeters between the crotch point and the back neck point. The total torso surface area is calculated by summing each segment's surface area value. The total torso volume is calculated by summing each segment's volume value. Table 1 depicts the output of the MEP used to determine torso height, torso surface area, and torso volume for the exemplary torso scan 415. As illustrated by Table 1, the torso height is divided into 1 cm segments, each segment's surface area and volume is calculated, and the surface area and volume calculations are added to determine the total surface area and volume of the torso scan 415.

TABLE 1

Subject's torso height segments and associated volume and surface area calculations
Units = centimeters, volume in cc

| Torso Height | Volume | Surface Area |
|---|---|---|
| 69 | 265.5 | 63.9 |
| 70 | 642.9 | 111.3 |
| 71 | 680.2 | 109.9 |
| 72 | 697.2 | 108.3 |
| 73 | 709.5 | 106.3 |
| 74 | 721 | 105.2 |
| 75 | 722.2 | 104.3 |
| 76 | 721.6 | 103.4 |
| 77 | 719 | 102.4 |
| 78 | 713.2 | 101.7 |
| 79 | 708.4 | 101.7 |
| 80 | 708.5 | 100.7 |
| 81 | 716.2 | 100.2 |
| 82 | 722 | 100 |
| 83 | 719.8 | 99.3 |
| 84 | 712.4 | 98.6 |
| 85 | 697.7 | 97.4 |
| 86 | 679.3 | 96.3 |
| 87 | 660.8 | 95.1 |
| 88 | 639.6 | 93.7 |
| 89 | 614.8 | 92.1 |
| 90 | 587.4 | 90.1 |
| 91 | 555.9 | 87.3 |
| 92 | 526 | 84.4 |
| 93 | 507.6 | 82.6 |
| 94 | 510 | 81.8 |
| 95 | 492.1 | 81 |
| 96 | 485.2 | 80.3 |
| 97 | 476.6 | 79.4 |
| 98 | 465.7 | 78.5 |
| 99 | 460.1 | 78 |
| 100 | 458.6 | 77.9 |
| 101 | 462.8 | 80.5 |
| 102 | 499.7 | 88.3 |
| 103 | 517.1 | 93.8 |
| 104 | 539.3 | 96.1 |
| 105 | 629.6 | 99 |
| 106 | 645.1 | 99.8 |
| 107 | 660.4 | 100.1 |
| 108 | 675.1 | 100 |
| 109 | 676.1 | 99.4 |
| 110 | 672.8 | 98 |
| 111 | 664.3 | 96.6 |
| 112 | 654.9 | 95.6 |
| 113 | 649 | 94.9 |
| 114 | 641.8 | 94.5 |
| 115 | 632.6 | 93.9 |
| 116 | 626.5 | 93.2 |
| 117 | 611 | 92 |
| 118 | 595.9 | 91.2 |
| 119 | 581.5 | 90.5 |
| 120 | 562.5 | 89.6 |
| 121 | 536.6 | 88.1 |
| 122 | 513.3 | 87.3 |
| 123 | 481.8 | 85.3 |
| 124 | 454.8 | 84.2 |
| 125 | 424.1 | 82.7 |
| 126 | 395.3 | 81.2 |
| 127 | 360.9 | 79 |
| 128 | 327 | 77.4 |
| 129 | 286.1 | 74.4 |
| 130 | 233.2 | 68 |
| 131 | 170.6 | 55.4 |
| 62 | 36068.7 | 5743.1 |

The last row of Table 1 indicates that the subject's torso height is 62 cm, the subject's torso volume is 36068.7 cubic centimeters, and the subject's torso surface area is 5743.1 centimeters, squared. The crotch point is located 69 cm from the floor, and the back neck point is located 131 cm from the floor, for a difference of 62 cm.

Using the formula introduced above, the Barix is calculated using the formula:

$$\text{Barix} = \frac{\text{Torso Height}}{(\text{Torso Volume}/\text{Torso Surface Area})}$$

Accordingly, the subject's Barix is:

$$\text{Barix} = \frac{62 \text{ cm}}{(36068 \text{ cm}^3 / 5743 \text{ cm}^2)}$$

Barix=9.872

Figure 7:
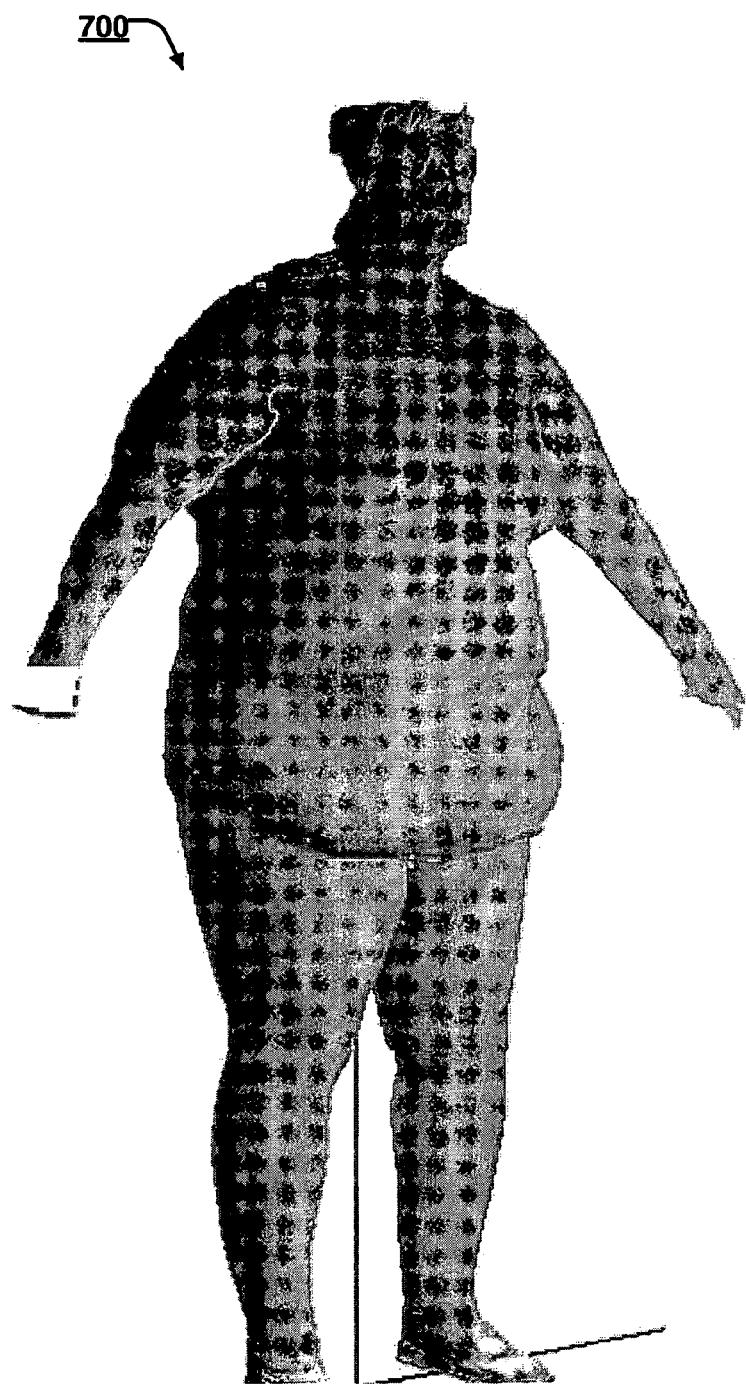
FIG. 7 shows an illustrative composite image of an exemplary subject's three-dimensional scan, according to this invention, wherein the composite image depicts a subject who is morbidly obese.
Figure 8:
FIG. 8 shows an illustrative composite image of the morbidly obese subject's torso shown in "surface" mode, according to this invention.

FIGS. 7 and 8 illustrate an exemplary, non-limiting embodiment of an example of calculating a subject's Barix, wherein the exemplary subject is morbidly obese. Beginning with FIG. 7, FIG. 7 shows an illustrative composite image 700 of an exemplary subject's three-dimensional scan, according to this invention, wherein the composite image depicts a subject who is morbidly obese.

FIG. 7 shows an illustrative composite image 700 of an exemplary subject's three-dimensional scan shown in a "surface" mode, according to this invention. This scan image was produced by a white light scanner, though other types of technology can be utilized to produce a accurate, three-dimensional, whole body image, as discussed above.

Linear and circumferential measurements as well as measurement height locations can be extracted from the image 700 by applying a programmable measurement-specific MEP to the scan image. In this fashion, hip, waist, abdomen, chest, bust, or other measurements can be extracted and documented.

FIG. 8 shows an illustrative composite image of the morbidly obese subject's torso 710 shown in "surface" mode, according to this invention. As shown in FIG. 8, the torso portion 710 of the subject's scanned image has been defined within the scanned image 700, as shown in FIG. 7. It is to be noted that while the subject's head and neck is illustrated in FIG. 8, the head and neck portion are not included in the torso height, surface area, and volume calculations, as discussed above.

Following the methods of this invention, a MEP file is used to calculate the torso height, the torso surface area, and the torso volume. Table 2 depicts the output of the MEP used to determine torso height, torso surface area, and torso volume for the exemplary torso scan 710. As illustrated by Table 2, the torso height is divided into 1 cm segments, each segment's surface area and volume is calculated, and the surface area and volume calculations are added to determine the total surface area and volume of the torso scan 710.

TABLE 2

Morbidly obese subject's torso height segments and associated volume and surface area calculations
Units = centimeters, volume in cc

| Torso Height | Volume | Surface Area |
|---|---|---|
| 66.7 | 528.2 | 64.8 |
| 67.7 | 1140.9 | 132.2 |
| 68.7 | 1230.1 | 136.2 |
| 69.7 | 1223 | 137.6 |
| 70.7 | 1342 | 138.8 |

TABLE 2-continued

Morbidly obese subject's torso height segments and associated volume and surface area calculations
Units = centimeters, volume in cc

| Torso Height | Volume | Surface Area |
|---|---|---|
| 71.7 | 1418.7 | 140.4 |
| 72.7 | 1445.2 | 141.8 |
| 73.7 | 1447.5 | 142.9 |
| 74.7 | 1506.2 | 144.5 |
| 75.7 | 1510.5 | 144.8 |
| 76.7 | 1540.7 | 145.7 |
| 77.7 | 1599.7 | 146.8 |
| 78.7 | 1630.9 | 147.3 |
| 79.7 | 1635.7 | 146.6 |
| 80.7 | 1635.1 | 146.3 |
| 81.7 | 1631.7 | 145.6 |
| 82.7 | 1621.3 | 144.8 |
| 83.7 | 1606 | 144.1 |
| 84.7 | 1585.2 | 143.3 |
| 85.7 | 1562.7 | 142.2 |
| 86.7 | 1546.1 | 141.3 |
| 87.7 | 1535 | 140.2 |
| 88.7 | 1529.7 | 139.6 |
| 89.7 | 1517.5 | 138.7 |
| 90.7 | 1506.7 | 138.1 |
| 91.7 | 1488 | 137.1 |
| 92.7 | 1463.4 | 135.9 |
| 93.7 | 1433.7 | 134.6 |
| 94.7 | 1396.5 | 133 |
| 95.7 | 1359.8 | 131.7 |
| 96.7 | 1326.6 | 130.4 |
| 97.7 | 1296.7 | 129.1 |
| 98.7 | 1251.9 | 127.4 |
| 99.7 | 1212.5 | 125.8 |
| 100.7 | 1179 | 124 |
| 101.7 | 1160.8 | 122.9 |
| 102.7 | 1150.8 | 122.4 |
| 103.7 | 1147.5 | 122.6 |
| 104.7 | 1174.1 | 125.3 |
| 105.7 | 1233.5 | 130 |
| 106.7 | 1292.5 | 133.1 |
| 107.7 | 1334.6 | 135.1 |
| 108.7 | 1343.6 | 134.8 |
| 109.7 | 1345.4 | 134.7 |
| 110.7 | 1331.5 | 135.1 |
| 111.7 | 1323.7 | 135.1 |
| 112.7 | 1312.5 | 134.6 |
| 113.7 | 1289.3 | 134 |
| 114.7 | 1269 | 134.2 |
| 115.7 | 1246.5 | 132.1 |
| 116.7 | 1220 | 130.4 |
| 117.7 | 1193.6 | 128.7 |
| 118.7 | 1166.7 | 126.6 |
| 119.7 | 1141.6 | 124.8 |
| 120.7 | 1114.6 | 122.9 |
| 121.7 | 1097 | 122.9 |
| 122.7 | 1075.1 | 122.3 |
| 123.7 | 1052 | 120.7 |
| 124.7 | 1044.7 | 120.6 |
| 125.7 | 1014.3 | 120 |
| 126.7 | 977.8 | 119.2 |
| 127.7 | 926.9 | 117.1 |
| 128.7 | 873 | 115.1 |
| 129.7 | 815.8 | 112.8 |
| 130.7 | 760.4 | 110.2 |
| 131.7 | 692.9 | 106.1 |
| 132.7 | 620.3 | 101.4 |
| 133.7 | 533.7 | 93.5 |
| 134.7 | 444.1 | 83.4 |
| 135.7 | 370.8 | 74.9 |
| 69 | 86965 | 9023.1 |

The last row of Table 2 indicates that the morbidly obese subject's torso height is 69 cm, the subject's torso volume is 86965 cubic centimeters ($cm^3$), and the subject's torso surface area is 9023.1 centimeters squared ($cm^2$).

Using the formula introduced above, the Barix is calculated using the formula:

$$Barix = \frac{\text{Torso Height}}{(\text{Torso Volume}/\text{Torso Surface Area})}$$

Accordingly, the morbidly obese subject's Barix is:

$$Barix = \frac{69 \text{ cm}}{(86965 \text{ cm}^3 / 9023 \text{ cm}^2)}$$

Barix=7.159

Figure 9:
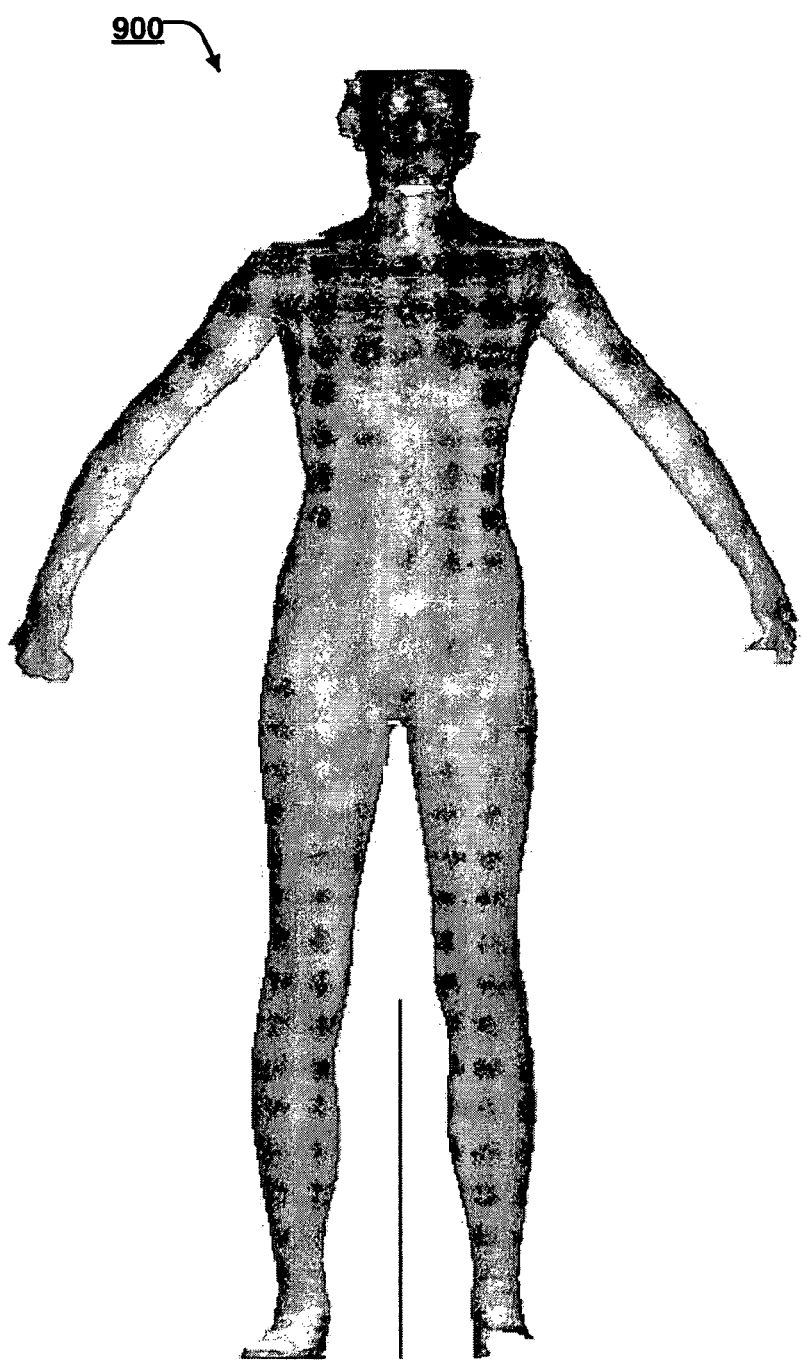
FIG. 9 shows an illustrative composite image of an exemplary subject's three-dimensional scan, according to this invention, wherein the scan image depicts a subject who has an ectomorphic body type.
Figure 10:
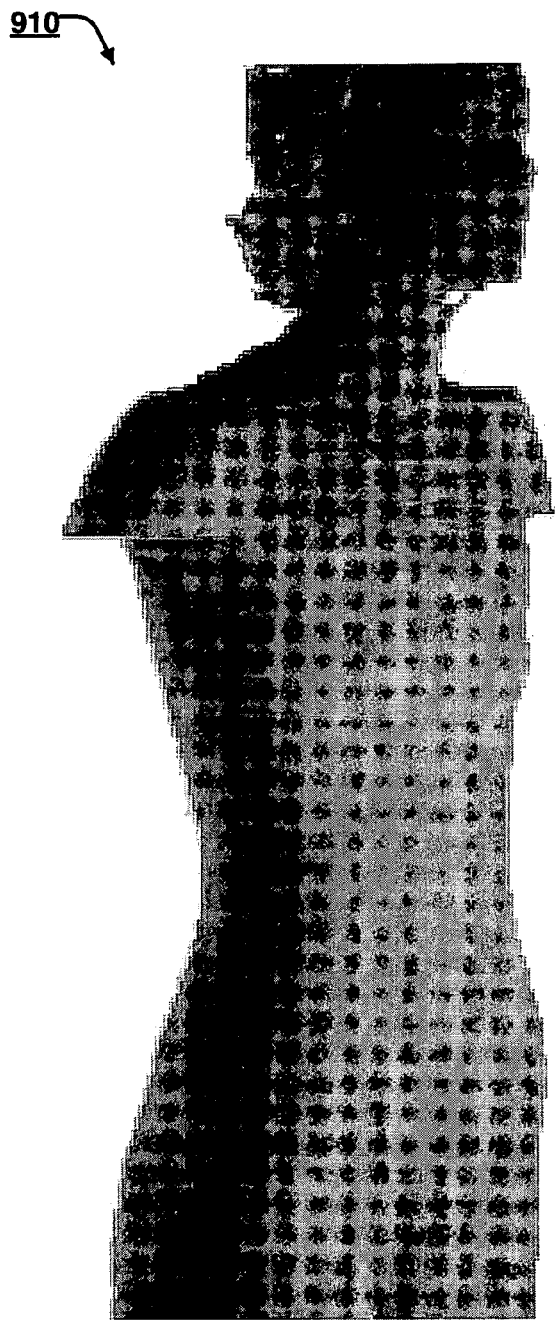
FIG. 10 shows an illustrative composite image of the torso of the ectomorphic body type example shown in "surface" mode, according to this invention.

FIGS. 9 and 10 illustrate an exemplary, non-limiting embodiment of an example of calculating a subject's Barix, wherein the exemplary subject has an ectomorphic body type. An ectomorphic build is generally slight and thin. Beginning with FIG. 9, FIG. 9 shows an illustrative composite image 900 of the exemplary ectomorphic subject's three-dimensional scan shown in a "surface" mode, according to this invention. This scan image was produced by a white light scanner, though other types of technology can be utilized to produce a accurate, three-dimensional, whole body image, as discussed above.

Linear and circumferential measurements as well as measurement height locations can be extracted from the image 900 by applying a programmable measurement-specific MEP to the scan image. In this fashion, hip, waist, abdomen, chest, bust, or other measurements can be extracted and documented.

FIG. 10 shows an illustrative composite image of the ectomorphic subject's torso 910 shown in "surface" mode, according to this invention. As shown in FIG. 10, the torso portion 910 of the subject's scanned image has been defined within the scanned image 900, as shown in FIG. 9. It is to be noted that while the subject's head and neck is illustrated in FIG. 10, the head and neck portion are not included in the torso height, surface area, and volume calculations, as discussed above.

Following the methods of this invention, a MEP file is used to calculate the torso height, the torso surface area, and the torso volume. Table 3 depicts the output of the MEP used to determine torso height, torso surface area, and torso volume for the exemplary torso scan 910. As illustrated by Table 3, the torso height is divided into 1 cm segments, each segment's surface area and volume is calculated, and the surface area and volume calculations are added to determine the total surface area and volume of the torso scan 910.

TABLE 3

Ectomorphic subject's torso height segments and associated volume and surface area calculations
Units = centimeters, volume in cc

| Torso Height | Volume | Surface Area |
|---|---|---|
| 87.2 | 287.3 | 52.8 |
| 88.2 | 595 | 102.9 |
| 89.2 | 612.2 | 101.1 |
| 90.2 | 627.4 | 100.3 |
| 91.2 | 639.6 | 99.6 |
| 92.2 | 649.1 | 99.2 |
| 93.2 | 653.1 | 98.8 |
| 94.2 | 655.6 | 98.3 |
| 95.2 | 655.3 | 97.8 |
| 96.2 | 652.5 | 97 |

TABLE 3-continued

Ectomorphic subject's torso height segments and associated
volume and surface area calculations
Units = centimeters, volume in cc

| Torso Height | Volume | Surface Area |
|---|---|---|
| 97.2 | 646.8 | 96.1 |
| 98.2 | 641.6 | 95.3 |
| 99.2 | 636.2 | 94.3 |
| 100.2 | 632.1 | 93.5 |
| 101.2 | 628.2 | 92.7 |
| 102.2 | 621.8 | 91.7 |
| 103.2 | 616.7 | 91.1 |
| 104.2 | 610.9 | 90.5 |
| 105.2 | 602.5 | 90 |
| 106.2 | 587.7 | 89.1 |
| 107.2 | 569.9 | 88.1 |
| 108.2 | 548.3 | 86.8 |
| 109.2 | 526.4 | 85.6 |
| 110.2 | 503.7 | 84.2 |
| 111.2 | 484.6 | 82.6 |
| 112.2 | 464.5 | 80.4 |
| 113.2 | 446.5 | 78.5 |
| 114.2 | 432.8 | 76.9 |
| 115.2 | 422.4 | 75.6 |
| 116.2 | 413.4 | 74.5 |
| 117.2 | 408.5 | 73.7 |
| 118.2 | 404.8 | 73.2 |
| 119.2 | 403.8 | 72.9 |
| 120.2 | 403.5 | 72.9 |
| 121.2 | 406.1 | 73.2 |
| 122.2 | 410.7 | 73.6 |
| 123.2 | 416.1 | 74.1 |
| 124.2 | 421.1 | 74.7 |
| 125.2 | 427.6 | 75.6 |
| 126.2 | 434.2 | 76.3 |
| 127.2 | 440.6 | 77 |
| 128.2 | 449.5 | 77.8 |
| 129.2 | 461.6 | 78.8 |
| 130.2 | 474.9 | 79.9 |
| 131.2 | 488.3 | 81.2 |
| 132.2 | 501.2 | 82.5 |
| 133.2 | 512.3 | 83.7 |
| 134.2 | 520.6 | 84.6 |
| 135.2 | 524.7 | 85.1 |
| 136.2 | 526.8 | 85.7 |
| 137.2 | 529.2 | 86.5 |
| 138.2 | 534.7 | 87.6 |
| 139.2 | 539.7 | 89 |
| 140.2 | 543.6 | 90.2 |
| 141.2 | 547.8 | 91.7 |
| 142.2 | 552.2 | 93.4 |
| 143.2 | 541.5 | 93.3 |
| 144.2 | 524.9 | 92.9 |
| 145.2 | 509.9 | 92.9 |
| 146.2 | 496.1 | 92.6 |
| 147.2 | 480.5 | 92.4 |
| 148.2 | 468.7 | 92.9 |
| 149.2 | 453.5 | 93 |
| 150.2 | 424.2 | 91.4 |
| 151.2 | 391.2 | 89.4 |
| 152.2 | 329.4 | 82.5 |
| 153.2 | 240.4 | 67.4 |
| 154.2 | 191.6 | 57.1 |
| 67 | 34400.1 | 5818 |

The last row of Table 3 indicates that the ectomorphic subject's torso height is 67 cm, the subject's torso volume is 34400 cubic centimeters (cm³), and the subject's torso surface area is 5818 centimeters squared (cm²).

Using the formula introduced above, the Barix is calculated using the formula:

$$Barix = \frac{\text{Torso Height}}{(\text{Torso Volume}/\text{Torso Surface Area})}$$

Accordingly, the ectomorphic subject's Barix is:

$$Barix = \frac{67 \text{ cm}}{(34400 \text{ cm}^3 / 5818 \text{ cm}^2)}$$

Barix=11.331

Figure 11:
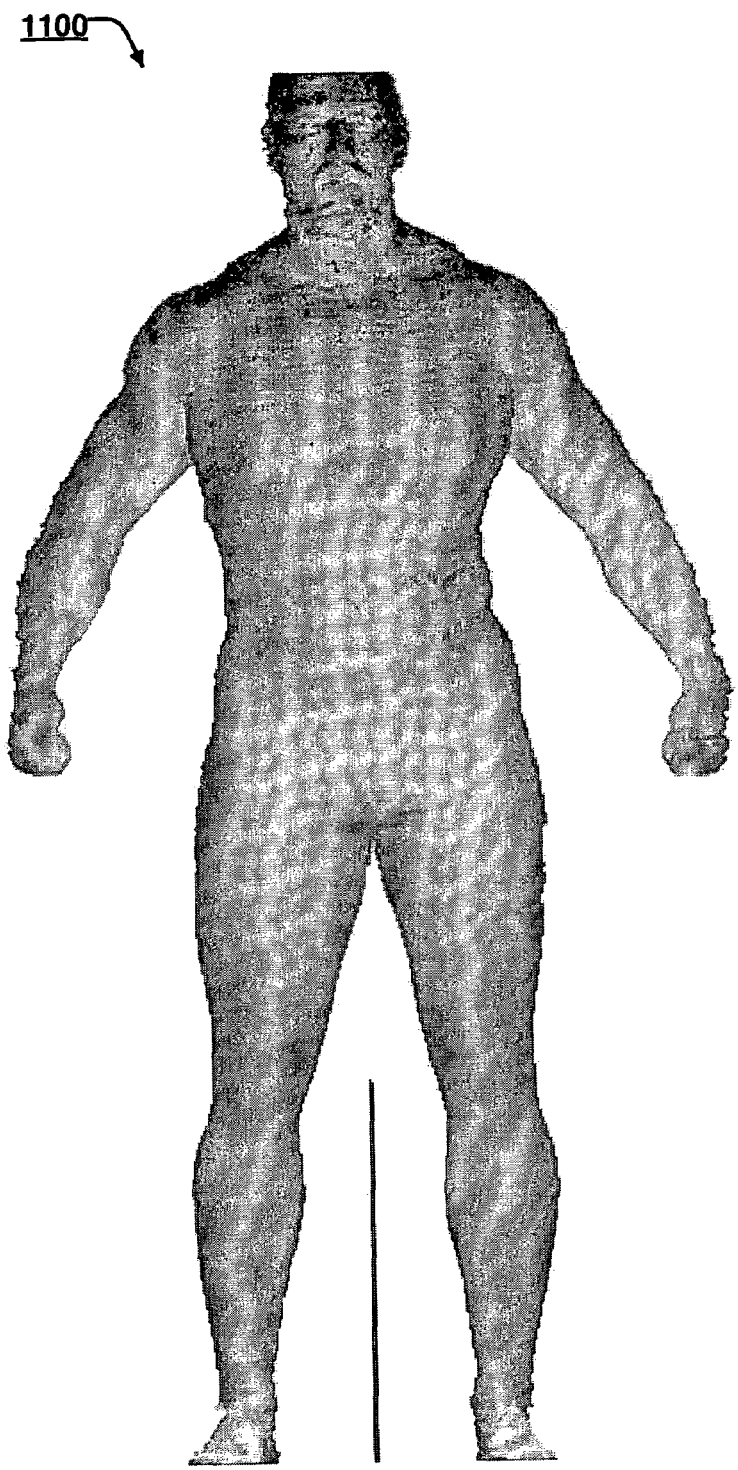
FIG. 11 shows an illustrative composite image of an exemplary subject's three-dimensional scan, according to this invention, wherein the scan image depicts a subject who has a mesomorph body type.
Figure 12:
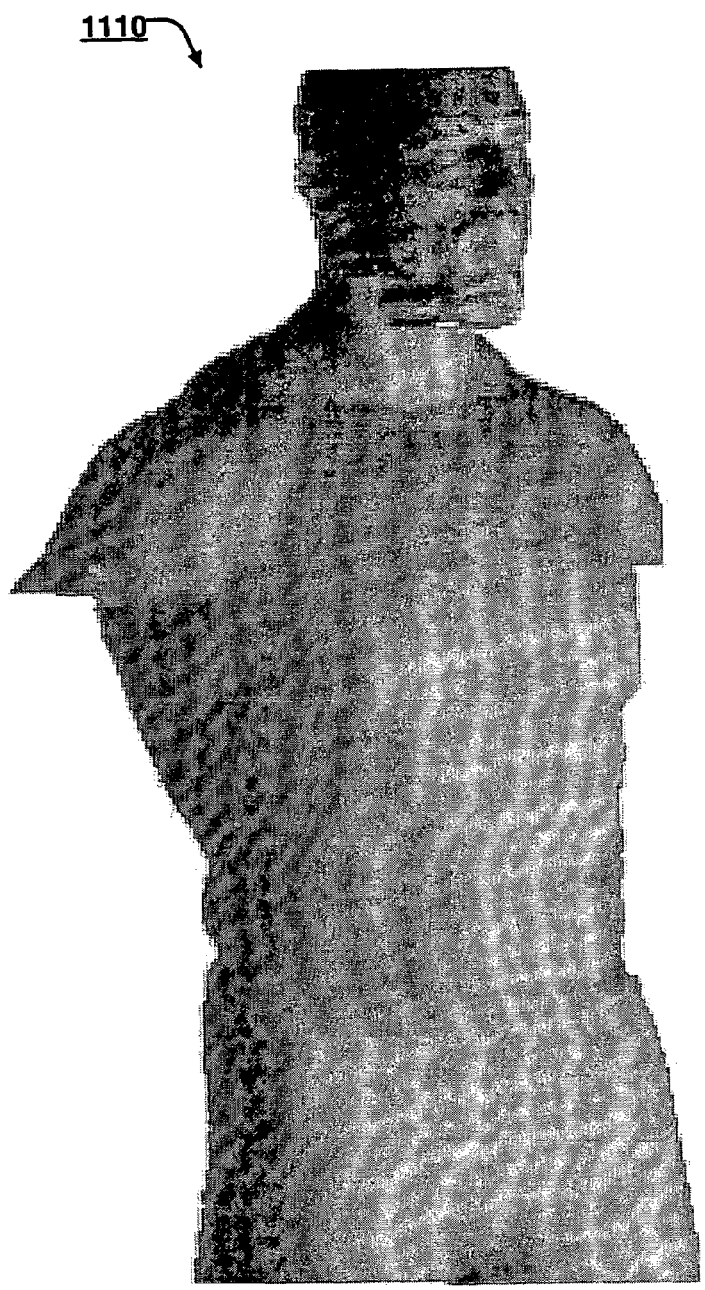
FIG. 12 shows an illustrative composite image of the torso of the mesomorphic body type example shown in "surface" mode, according to this invention.

FIGS. 11 and 12 illustrate an exemplary, non-limiting embodiment of an example of calculating a subject's Barix, wherein the exemplary subject has a mesomorphic body type. A mesomorphic build is generally muscular. Beginning with FIG. 11, FIG. 11 shows an illustrative composite image 1100 of the exemplary mesomorphic subject's three-dimensional scan shown in a "surface" mode, according to this invention. This scan image was produced by a white light scanner, though other types of technology can be utilized to produce a accurate, three-dimensional, whole body image, as discussed above.

Linear and circumferential measurements as well as measurement height locations can be extracted from the image 1100 by applying a programmable measurement-specific MEP to the scan image. In this fashion, hip, waist, abdomen, chest, bust, or other measurements can be extracted and documented.

FIG. 12 shows an illustrative composite image of the mesomorphic subject's torso 1110 shown in "surface" mode, according to this invention. As shown in FIG. 12, the torso portion 1110 of the subject's scanned image has been defined within the scanned image 1100, as shown in FIG. 11. It is to be noted that while the subject's head and neck is illustrated in FIG. 12, the head and neck portion are not included in the torso height, surface area, and volume calculations, as discussed above.

Following the methods of this invention, a MEP file is used to calculate the torso height, the torso surface area, and the torso volume. Table 4 depicts the output of the MEP used to determine torso height, torso surface area, and torso volume for the exemplary torso scan 1110. As illustrated by Table 4, the torso height is divided into 1 cm segments, each segment's surface area and volume is calculated, and the surface area and volume calculations are added to determine the total surface area and volume of the torso scan 1110.

TABLE 4

Mesomorphic subject's torso height segments and associated volume
and surface area calculations
Units = centimeters, volume in cc

| Torso Height | Volume | Surface Area |
|---|---|---|
| 80 | 307.9 | 70.3 |
| 81 | 741.4 | 117.4 |
| 82 | 798 | 113.7 |
| 83 | 830.8 | 112.7 |
| 84 | 854.5 | 112.2 |
| 85 | 871.2 | 112 |
| 86 | 882.3 | 111.8 |
| 87 | 886.9 | 111.6 |
| 88 | 886.4 | 111 |
| 89 | 879.1 | 110.3 |

TABLE 4-continued

Mesomorphic subject's torso height segments and associated volume and surface area calculations
Units = centimeters, volume in cc

| Torso Height | Volume | Surface Area |
|---|---|---|
| 90 | 869.1 | 109.5 |
| 91 | 856.1 | 108.7 |
| 92 | 841 | 107.6 |
| 93 | 828.7 | 106.7 |
| 94 | 819.5 | 106 |
| 95 | 812.3 | 105.2 |
| 96 | 807.6 | 104.6 |
| 97 | 806.7 | 104.1 |
| 98 | 807.3 | 103.8 |
| 99 | 805.3 | 103.5 |
| 100 | 800.6 | 103.1 |
| 101 | 789.8 | 102.3 |
| 102 | 769.1 | 101 |
| 103 | 757.6 | 100.3 |
| 104 | 749.9 | 99.9 |
| 105 | 735.7 | 98.6 |
| 106 | 720 | 96.9 |
| 107 | 710.2 | 96.1 |
| 108 | 705.7 | 96.4 |
| 109 | 710.4 | 97.7 |
| 110 | 718.5 | 97.6 |
| 111 | 719.6 | 98 |
| 112 | 714.5 | 98 |
| 113 | 716.7 | 98.1 |
| 114 | 721.8 | 98.5 |
| 115 | 731.8 | 99.4 |
| 116 | 741.7 | 100 |
| 117 | 752.4 | 100.9 |
| 118 | 763.6 | 101.8 |
| 119 | 778 | 103 |
| 120 | 800.9 | 104.9 |
| 121 | 820.1 | 106.2 |
| 122 | 837.1 | 107.4 |
| 123 | 851.5 | 108.8 |
| 124 | 866.1 | 110 |
| 125 | 884 | 111.2 |
| 126 | 910.3 | 113.3 |
| 127 | 939.9 | 115.9 |
| 128 | 968.3 | 118.1 |
| 129 | 997.2 | 120.3 |
| 130 | 1024.7 | 121.8 |
| 131 | 1051.4 | 123.5 |
| 132 | 1069.9 | 124.4 |
| 133 | 1081.7 | 125 |
| 134 | 1090.2 | 125.5 |
| 135 | 1092.4 | 125.7 |
| 136 | 1093.7 | 125.7 |
| 137 | 1076.9 | 124.7 |
| 138 | 1055.2 | 123.4 |
| 139 | 1036.9 | 122.3 |
| 140 | 1014.7 | 121.3 |
| 141 | 992.2 | 120.4 |
| 142 | 963.6 | 118.8 |
| 143 | 936.7 | 117.5 |
| 144 | 892.4 | 115.2 |
| 145 | 844.9 | 113.1 |
| 146 | 792.8 | 110.8 |
| 147 | 729.8 | 107.5 |
| 148 | 660.7 | 103.2 |
| 149 | 580.8 | 97.6 |
| 150 | 496.4 | 90.4 |
| 151 | 428.2 | 83.1 |
| 152 | 374.7 | 76.5 |
| 153 | 325.8 | 71.1 |
| 154 | 274.9 | 65 |
| 155 | 247.9 | 63.8 |
| 156 | 237.6 | 64.2 |
| 157 | 222.4 | 59.6 |
| 77 | 61564.6 | 8187.5 |

The last row of Table 4 indicates that the mesomorphic subject's torso height is 77 cm, the subject's torso volume is 61564.6 cubic centimeters (cm$^3$), and the subject's torso surface area is 8187.5 centimeters squared (cm$^2$).

Using the formula introduced above, the Barix is calculated using the formula:

$$\text{Barix} = \frac{\text{Torso Height}}{(\text{Torso Volume}/\text{Torso Surface Area})}$$

Accordingly, the mesomorphic subject's Barix is:

$$\text{Barix} = \frac{77 \text{ cm}}{(61564.6 \text{ cm}^3 / 8187.5 \text{ cm}^2)}$$

Barix=10.241

It should be noted that the exemplary mesomorphic subject's height is 5' 10" and his weight at the time of the scan was 225 lbs. The traditional BMI calculation for this subject is 32. A BMI of 32 is considered obese.

Figure 13:
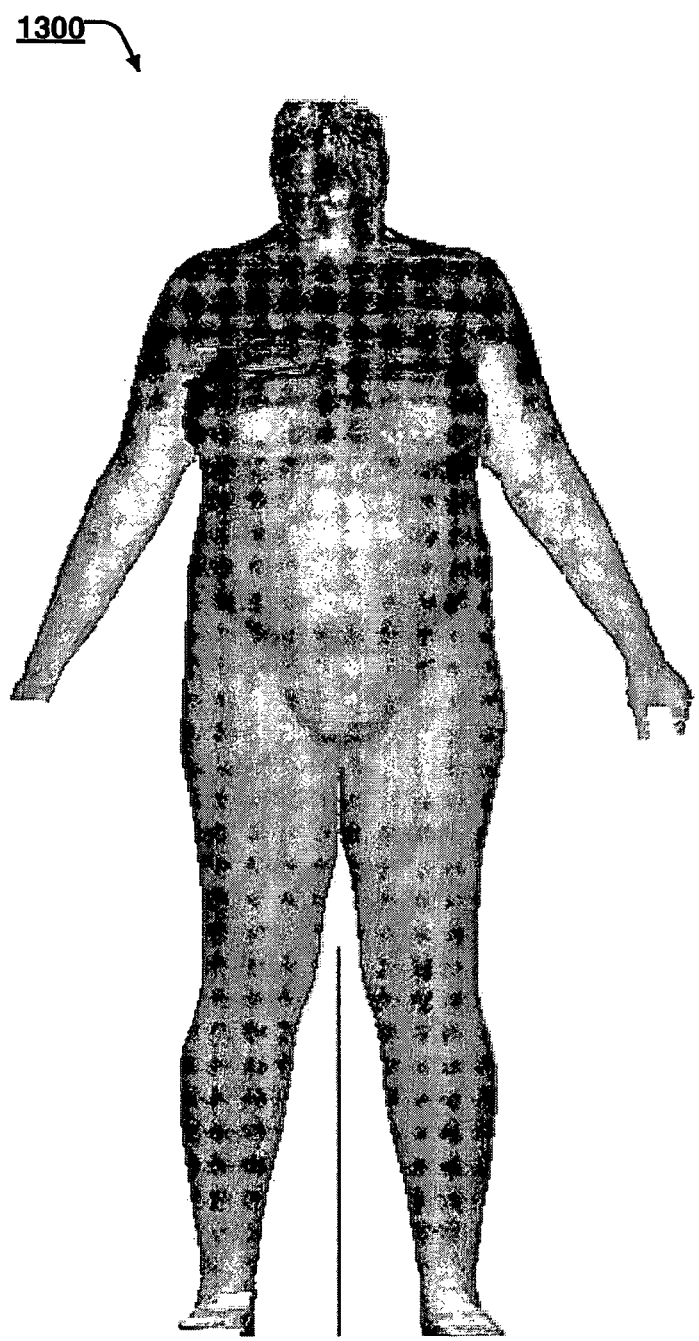
FIG. 13 shows an illustrative composite image of an exemplary subject's three-dimensional scan, according to this invention, wherein the scan image depicts a subject who has a endomorph body type.
Figure 14:
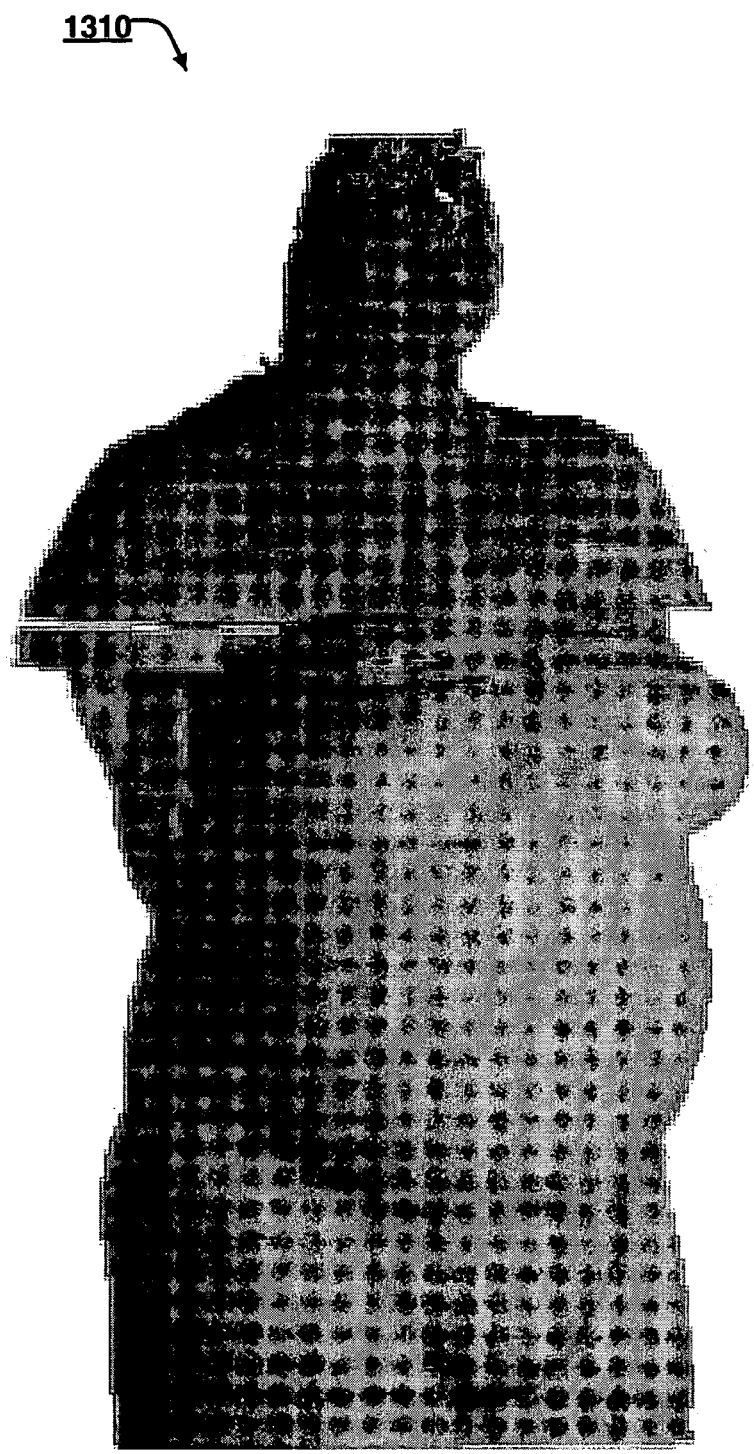
FIG. 14 shows an illustrative composite image of the torso of the endomorph body type example shown in "surface" mode, according to this invention.

FIGS. 13 and 14 illustrate an exemplary, non-limiting embodiment of an example of calculating a subject's Barix, wherein the exemplary subject has a endomorphic body type. A endomorphic build is generally disposed toward greater adiposity. Beginning with FIG. 13, FIG. 13 shows an illustrative composite image 1300 of the exemplary endomorphic subject's three-dimensional scan shown in a "surface" mode, according to this invention. This scan image was produced by a white light scanner, though other types of technology can be utilized to produce a accurate, three-dimensional, whole body image, as discussed above.

Linear and circumferential measurements as well as measurement height locations can be extracted from the image 1300 by applying a programmable measurement-specific MEP to the scan image. In this fashion, hip, waist, abdomen, chest, bust, or other measurements can be extracted and documented.

FIG. 14 shows an illustrative composite image of the endomorphic subject's torso 1310 shown in "surface" mode, according to this invention. As shown in FIG. 14, the torso portion 1310 of the subject's scanned image has been defined within the scanned image 1300, as shown in FIG. 13. It is to be noted that while the subject's head and neck is illustrated in FIG. 14, the head and neck portion are not included in the torso height, surface area, and volume calculations, as discussed above.

Following the methods of this invention, a MEP file is used to calculate the torso height, the torso surface area, and the torso volume. Table 5 depicts the output of the MEP used to determine torso height, torso surface area, and torso volume for the exemplary torso scan 1310. As illustrated by Table 5, the torso height is divided into 1 cm segments, each segment's surface area and volume is calculated, and the surface area and volume calculations are added to determine the total surface area and volume of the torso scan 1310.

TABLE 5

Endomorphic subject's torso height segments and associated volume and surface area calculations
Units = centimeters, volume in cc

| Torso Height | Volume | Surface Area |
|---|---|---|
| 72.8 | 380.1 | 54.8 |
| 73.8 | 780.8 | 109.1 |
| 74.8 | 804.2 | 108.7 |

TABLE 5-continued

Endomorphic subject's torso height segments and associated volume and surface area calculations
Units = centimeters, volume in cc

| Torso Height | Volume | Surface Area |
|---|---|---|
| 75.8 | 829.7 | 108.4 |
| 76.8 | 864.1 | 109.7 |
| 77.8 | 881.9 | 110 |
| 78.8 | 894.2 | 110.2 |
| 79.8 | 901.5 | 110.5 |
| 80.8 | 907.9 | 110.8 |
| 81.8 | 908.7 | 110.7 |
| 82.8 | 913 | 110.7 |
| 83.8 | 912.8 | 110.5 |
| 84.8 | 908 | 110 |
| 85.8 | 903 | 109.5 |
| 86.8 | 900.6 | 109.5 |
| 87.8 | 904 | 110 |
| 88.8 | 909.4 | 110.5 |
| 89.8 | 914.5 | 110.6 |
| 90.8 | 919.5 | 110.6 |
| 91.8 | 920 | 110.3 |
| 92.8 | 920.4 | 110 |
| 93.8 | 921.8 | 109.8 |
| 94.8 | 921.1 | 109.8 |
| 95.8 | 919.1 | 109.5 |
| 96.8 | 920.2 | 109.5 |
| 97.8 | 920.7 | 109.6 |
| 98.8 | 926 | 109.9 |
| 99.8 | 924.6 | 109.9 |
| 100.8 | 919.9 | 109.6 |
| 101.8 | 916.7 | 109.3 |
| 102.8 | 912.3 | 108.8 |
| 103.8 | 906.6 | 108.3 |
| 104.8 | 898.8 | 107.6 |
| 105.8 | 890.2 | 106.8 |
| 106.8 | 889.5 | 106.8 |
| 107.8 | 896.6 | 107.3 |
| 108.8 | 902.8 | 107.8 |
| 109.8 | 909.4 | 108.2 |
| 110.8 | 922.2 | 109.5 |
| 111.8 | 946 | 112.9 |
| 112.8 | 973.2 | 117.3 |
| 113.8 | 1006.2 | 120.5 |
| 114.8 | 1033.2 | 124.1 |
| 115.8 | 1047.4 | 126.1 |
| 116.8 | 1069.9 | 129 |
| 117.8 | 1079.4 | 130.7 |
| 118.8 | 1078.7 | 131 |
| 119.8 | 1071 | 132.1 |
| 120.8 | 1044.7 | 130 |
| 121.8 | 1003 | 126.6 |
| 122.8 | 988 | 119.9 |
| 123.8 | 953.1 | 115 |
| 124.8 | 918 | 111.6 |
| 125.8 | 891.3 | 109.6 |
| 126.8 | 864 | 108.6 |
| 127.8 | 825.8 | 106.9 |
| 128.8 | 786 | 105.1 |
| 129.8 | 740.9 | 102.7 |
| 130.8 | 687.7 | 99.8 |
| 131.8 | 638.7 | 97.5 |
| 132.8 | 589 | 95.2 |
| 133.8 | 543.1 | 93.3 |
| 134.8 | 496.6 | 91.6 |
| 135.8 | 438.8 | 88.2 |
| 136.8 | 372.5 | 82.3 |
| 137.8 | 272.8 | 66.5 |
| 138.8 | 199.4 | 52.5 |
| 66 | 57155.2 | 7239.7 |

The last row of Table 5 indicates that the endomorphic subject's torso height is 66 cm, the subject's torso volume is approximately 57155 cubic centimeters ($cm^3$), and the subject's torso surface area is approximately 7240 centimeters squared ($cm^2$).

Using the formula introduced above, the Barix is calculated using the formula:

$$Barix = \frac{\text{Torso Height}}{(\text{Torso Volume}/\text{Torso Surface Area})}$$

Accordingly, the endomorphic subject's Barix is:

$$Barix = \frac{66 \text{ cm}}{(57155 \text{ cm}^3 / 7240 \text{ cm}^2)}$$

Barix=8.360

Table 6 summarizes the Barix calculations for the exemplary morbidly obese subject, the endomorphic subject, the mesomorphic subject, and the ectomorphic subject, as illustrated in FIGS. 4 through 14.

TABLE 6

Summary of Barix calculations for the exemplary morbidly obese subject, the endomorphic subject, the mesomorphic subject, and the ectomorph subject

| | Morbidly Obese | Endomorph | Mesomorph | Ectomorph |
|---|---|---|---|---|
| Barix | 7.159 | 8.360 | 10.241 | 11.331 |

Table 6 gives an indication of the descending nature of the Barix scale. The lower the Barix, the greater the adiposity, or degree of the bariatric condition of the subject. As stated above, the Barix calculation is a dimensionless quantity that indicates the general adiposity of a subject. To fully understand the implication of this number, a subject's Barix should initially be interpreted against a generalized Barix scale. The generalized Barix scale is a scale developed by calculating the Barix from a sample population of adult subjects.

The generalized Barix scale is a general scale encompassing all adult body types. A subject's particular Barix can then be compared to the scale in order to understand what percentile the subject's Barix falls within. The subject and/or the subject's physician can utilize this information to understand whether any corrections in lifestyle are needed to improve the subject's Barix.

In one non-limiting embodiment, an exemplary generalized Barix scale has been created from a sample of 200 adult subjects of various body types. For exemplary purposes, 200 samples provides for a general outline of the principles and utility of a general or generalized Barix scale. It should be appreciated that as additional samples are added to an exemplary generalized Barix scale, the generalized Barix scale can be modified or calibrated as needed.

It should also be appreciated that the exemplary generalized Barix scale is for a basic explanation and understanding of the operation of the systems and methods of this invention and to show the existence of certain exemplary cut-off points that can be used to categorize a subject's adiposity within the general population. Therefore, the exemplary generalized Barix scale is not to be construed as limiting the systems and methods of this invention.

Table 7 summarizes a statistical analysis of 200 adult subjects to form an exemplary generalized Barix scale. A Barix was calculated for each of the adult subjects, according to the methods outlined herein. Circumferential waist and hip measurements were extracted from each scan image and recorded. The waist-to-hip ratio was calculated, and the torso height was recorded. Descriptive statistics were then calculated, including the arithmetic mean, median, standard deviation, and variance.

TABLE 7

Descriptive statistics for exemplary generalized Barix scale
Barix Sample Descriptive Statistics

| | |
|---|---|
| Mean | 9.670515 |
| Standard Error | 0.095358 |
| Median | 9.814 |
| Mode | 9.872 |
| Standard Deviation | 1.348573 |
| Sample Variance | 1.818648 |
| Kurtosis | −0.46183 |
| Skewness | −0.32477 |
| Range | 6.815 |
| Minimum | 5.781 |
| Maximum | 12.596 |
| Sum | 1934.103 |
| Count | 200 |

As outlined in Table 7, the arithmetic mean for this exemplary population is 9.671. The confidence level used to calculate the mean was 95%. The median is 9.814, meaning that half the population's Barix is above 9.814 and half is below.

The standard deviation is 1.349. In this case, 63% of the population had a Barix of between 11.020 and 8.465. 18% if the population had a Barix above 11.02. 19% of the population had a Barix below 8.465. Those with a Barix higher than 11.02 were generally thin and/or physically fit. Those with a Barix below 8.465 were considered very obese or morbidly obese.

Only one of the samples was 2 standard deviations above the mean. Three of the samples were below 2 standard deviations from the mean.

To understand how a subject's Barix relates to this population, rank and percentile calculations were made. Table 8 shows the ranking and percentile of the sample population.

TABLE 8

Rankings and Percentile of the Sample Population Barix Calculations

| Point | Barix | Rank | Percent |
|---|---|---|---|
| 181 | 12.596 | 1 | 100.00% |
| 168 | 12.175 | 2 | 99.40% |
| 6 | 12.044 | 3 | 98.90% |
| 164 | 12.031 | 4 | 98.40% |
| 54 | 12.02 | 5 | 97.90% |
| 122 | 11.979 | 6 | 97.40% |
| 182 | 11.908 | 7 | 96.90% |
| 22 | 11.822 | 8 | 96.40% |
| 116 | 11.683 | 9 | 95.90% |
| 173 | 11.516 | 10 | 95.40% |
| 170 | 11.506 | 11 | 94.90% |
| 90 | 11.503 | 12 | 94.40% |
| 61 | 11.502 | 13 | 93.90% |
| 176 | 11.473 | 14 | 93.40% |
| 92 | 11.462 | 15 | 92.90% |
| 21 | 11.409 | 16 | 92.40% |
| 152 | 11.378 | 17 | 91.90% |
| 139 | 11.376 | 18 | 91.40% |
| 62 | 11.365 | 19 | 90.90% |
| 47 | 11.361 | 20 | 90.40% |
| 138 | 11.345 | 21 | 89.90% |
| 4 | 11.332 | 22 | 89.40% |
| 172 | 11.329 | 23 | 88.90% |
| 93 | 11.322 | 24 | 88.40% |
| 38 | 11.32 | 25 | 87.90% |
| 64 | 11.311 | 26 | 87.40% |
| 137 | 11.304 | 27 | 86.90% |
| 94 | 11.285 | 28 | 86.40% |

TABLE 8-continued

Rankings and Percentile of the Sample Population Barix Calculations

| Point | Barix | Rank | Percent |
|---|---|---|---|
| 162 | 11.253 | 29 | 85.90% |
| 63 | 11.252 | 30 | 85.40% |
| 114 | 11.215 | 31 | 84.90% |
| 179 | 11.147 | 32 | 84.40% |
| 112 | 11.084 | 33 | 83.90% |
| 91 | 11.083 | 34 | 83.40% |
| 148 | 11.056 | 35 | 82.90% |
| 115 | 11.031 | 36 | 82.40% |
| 185 | 11.002 | 37 | 81.90% |
| 167 | 10.969 | 38 | 81.40% |
| 127 | 10.963 | 39 | 80.90% |
| 71 | 10.954 | 40 | 80.40% |
| 39 | 10.941 | 41 | 79.80% |
| 174 | 10.931 | 42 | 79.30% |
| 119 | 10.903 | 43 | 78.80% |
| 117 | 10.889 | 44 | 78.30% |
| 149 | 10.883 | 45 | 77.80% |
| 180 | 10.865 | 46 | 77.30% |
| 136 | 10.828 | 47 | 76.80% |
| 130 | 10.798 | 48 | 76.30% |
| 151 | 10.791 | 49 | 75.80% |
| 81 | 10.746 | 50 | 75.30% |
| 131 | 10.722 | 51 | 74.80% |
| 111 | 10.699 | 52 | 74.30% |
| 106 | 10.677 | 53 | 73.80% |
| 3 | 10.637 | 54 | 73.30% |
| 2 | 10.618 | 55 | 72.80% |
| 89 | 10.554 | 56 | 72.30% |
| 188 | 10.54 | 57 | 71.80% |
| 35 | 10.508 | 58 | 71.30% |
| 53 | 10.492 | 59 | 70.80% |
| 15 | 10.484 | 60 | 70.30% |
| 80 | 10.477 | 61 | 69.80% |
| 16 | 10.447 | 62 | 69.30% |
| 165 | 10.412 | 63 | 68.80% |
| 41 | 10.405 | 64 | 68.30% |
| 155 | 10.401 | 65 | 67.80% |
| 34 | 10.355 | 66 | 67.30% |
| 144 | 10.347 | 67 | 66.80% |
| 175 | 10.324 | 68 | 66.30% |
| 158 | 10.274 | 69 | 65.80% |
| 55 | 10.268 | 70 | 65.30% |
| 57 | 10.242 | 71 | 64.80% |
| 150 | 10.225 | 72 | 64.30% |
| 83 | 10.222 | 73 | 63.80% |
| 146 | 10.202 | 74 | 63.30% |
| 200 | 10.18 | 75 | 62.80% |
| 56 | 10.178 | 76 | 62.30% |
| 161 | 10.13 | 77 | 61.80% |
| 163 | 10.127 | 78 | 61.30% |
| 70 | 10.126 | 79 | 60.80% |
| 74 | 10.12 | 80 | 60.30% |
| 40 | 10.076 | 81 | 59.70% |
| 67 | 10.075 | 82 | 58.70% |
| 69 | 10.075 | 82 | 58.70% |
| 79 | 10.056 | 84 | 58.20% |
| 125 | 9.999 | 85 | 57.70% |
| 43 | 9.991 | 86 | 57.20% |
| 42 | 9.976 | 87 | 56.70% |
| 73 | 9.928 | 88 | 56.20% |
| 31 | 9.924 | 89 | 55.70% |
| 189 | 9.903 | 90 | 55.20% |
| 66 | 9.885 | 91 | 54.70% |
| 178 | 9.878 | 92 | 54.20% |
| 28 | 9.872 | 93 | 53.20% |
| 30 | 9.872 | 93 | 53.20% |
| 68 | 9.864 | 95 | 52.70% |
| 118 | 9.858 | 96 | 52.20% |
| 7 | 9.843 | 97 | 51.70% |
| 20 | 9.841 | 98 | 51.20% |
| 109 | 9.836 | 99 | 50.70% |
| 143 | 9.82 | 100 | 50.20% |
| 29 | 9.808 | 101 | 49.70% |
| 120 | 9.799 | 102 | 49.20% |
| 197 | 9.752 | 103 | 48.70% |

TABLE 8-continued

Rankings and Percentile of the Sample Population Barix Calculations

| Point | Barix | Rank | Percent |
|---|---|---|---|
| 18 | 9.719 | 104 | 48.20% |
| 98 | 9.71 | 105 | 47.70% |
| 186 | 9.69 | 106 | 47.20% |
| 14 | 9.687 | 107 | 46.70% |
| 60 | 9.677 | 108 | 46.20% |
| 72 | 9.648 | 109 | 45.70% |
| 32 | 9.639 | 110 | 45.20% |
| 198 | 9.625 | 111 | 44.70% |
| 12 | 9.616 | 112 | 44.20% |
| 17 | 9.614 | 113 | 43.70% |
| 76 | 9.61 | 114 | 43.20% |
| 97 | 9.586 | 115 | 42.70% |
| 159 | 9.583 | 116 | 42.20% |
| 13 | 9.534 | 117 | 41.70% |
| 19 | 9.527 | 118 | 41.20% |
| 108 | 9.515 | 119 | 40.70% |
| 50 | 9.512 | 120 | 40.20% |
| 129 | 9.47 | 121 | 39.60% |
| 194 | 9.466 | 122 | 39.10% |
| 160 | 9.446 | 123 | 38.60% |
| 23 | 9.417 | 124 | 38.10% |
| 65 | 9.402 | 125 | 37.60% |
| 87 | 9.293 | 126 | 37.10% |
| 184 | 9.257 | 127 | 36.60% |
| 24 | 9.222 | 128 | 36.10% |
| 140 | 9.191 | 129 | 35.60% |
| 132 | 9.152 | 130 | 35.10% |
| 8 | 9.147 | 131 | 34.60% |
| 183 | 9.1 | 132 | 34.10% |
| 121 | 9.098 | 133 | 33.60% |
| 105 | 9.071 | 134 | 33.10% |
| 75 | 9.055 | 135 | 32.60% |
| 157 | 9.023 | 136 | 32.10% |
| 187 | 9.015 | 137 | 31.60% |
| 84 | 9.013 | 138 | 31.10% |
| 192 | 8.999 | 139 | 30.60% |
| 166 | 8.99 | 140 | 30.10% |
| 49 | 8.944 | 141 | 29.60% |
| 5 | 8.931 | 142 | 29.10% |
| 100 | 8.928 | 143 | 28.60% |
| 99 | 8.908 | 144 | 28.10% |
| 1 | 8.851 | 145 | 27.60% |
| 196 | 8.839 | 146 | 27.10% |
| 177 | 8.822 | 147 | 26.60% |
| 48 | 8.81 | 148 | 26.10% |
| 85 | 8.8 | 149 | 25.60% |
| 25 | 8.763 | 150 | 25.10% |
| 59 | 8.739 | 151 | 24.60% |
| 104 | 8.716 | 152 | 24.10% |
| 86 | 8.698 | 153 | 23.10% |
| 113 | 8.698 | 153 | 23.10% |
| 27 | 8.671 | 155 | 22.60% |
| 169 | 8.617 | 156 | 22.10% |
| 145 | 8.588 | 157 | 21.60% |
| 11 | 8.545 | 158 | 21.10% |
| 147 | 8.544 | 159 | 20.60% |
| 191 | 8.543 | 160 | 20.10% |
| 58 | 8.518 | 161 | 19.50% |
| 10 | 8.421 | 162 | 19.00% |
| 52 | 8.42 | 163 | 18.50% |
| 195 | 8.414 | 164 | 18.00% |
| 9 | 8.413 | 165 | 17.50% |
| 135 | 8.36 | 166 | 17.00% |
| 88 | 8.274 | 167 | 16.50% |
| 103 | 8.234 | 168 | 16.00% |
| 126 | 8.166 | 169 | 15.50% |
| 78 | 8.094 | 170 | 15.00% |
| 46 | 8.034 | 171 | 14.50% |
| 51 | 8.003 | 172 | 14.00% |
| 37 | 7.998 | 173 | 13.50% |
| 124 | 7.955 | 174 | 13.00% |
| 96 | 7.945 | 175 | 12.50% |
| 171 | 7.895 | 176 | 12.00% |
| 36 | 7.887 | 177 | 11.50% |
| 193 | 7.88 | 178 | 11.00% |
| 26 | 7.872 | 179 | 10.50% |
| 77 | 7.783 | 180 | 10.00% |
| 95 | 7.759 | 181 | 9.50% |
| 123 | 7.749 | 182 | 9.00% |
| 102 | 7.746 | 183 | 8.50% |
| 45 | 7.531 | 184 | 8.00% |
| 153 | 7.517 | 185 | 7.50% |
| 142 | 7.498 | 186 | 7.00% |
| 44 | 7.437 | 187 | 6.50% |
| 134 | 7.374 | 188 | 6.00% |
| 199 | 7.35 | 189 | 5.50% |
| 101 | 7.306 | 190 | 5.00% |
| 190 | 7.258 | 191 | 4.50% |
| 110 | 7.197 | 192 | 4.00% |
| 82 | 7.166 | 193 | 3.50% |
| 133 | 7.012 | 194 | 3.00% |
| 107 | 6.987 | 195 | 2.50% |
| 33 | 6.983 | 196 | 2.00% |
| 141 | 6.977 | 197 | 1.50% |
| 156 | 6.623 | 198 | 1.00% |
| 154 | 6.447 | 199 | .50% |
| 128 | 5.781 | 200 | .00% |

Using the above data, an exemplary generalized Barix scale was created. Table 9 summarizes the exemplary generalized Barix scale.

TABLE 9

Exemplary generalized Barix scale

| Percentile | Barix | Indication |
|---|---|---|
| 91-100 | 12.596 | Problematically Thin |
| 50-90 | 11.345 | Thin |
| Below 50 | 9.814 (median) | Average |
| Below 40 | 9.470 | Overweight |
| Below 30 | 8.944 | Obese |
| Below 20 | 8.518 | Extremely Obese |
| Below 10 | 7.783 | Morbidly Obese |

Table 6 gives an indication of the descending nature of the Barix scale. The lower the Barix, the greater the adiposity, or degree of the bariatric condition of the subject. To fully understand the implication of this number, a subject's Barix should initially be interpreted against a generalized Barix scale.

As stated above, the Barix calculation is a dimensionless quantity that is designed to indicate the general adiposity of a subject, the lower the Barix, the greater the degree of adiposity. The generalized Barix scale emphasizes the percentiles below 50%. Individuals with a Barix that is near or above the median tend to appear fit or well proportioned. However, an extremely high Barix number could indicate a medical condition, such as anorexia. The anorexic subject's Barix would be interpreted against the anorexic index, which is a specialized Barix scale.

There exists an optimal Barix range for each subject, regardless of what category the subject is in. The optimal Barix range is defined as a narrow range of the highest feasible Barix values that a subject can obtain without generating medical risks (anorexia, anemia, etc.). The optimal Barix can also be a useful indicator to track post-operative recovery from surgical procedures that affect contour changes in a subject's torso, as discussed below.

Medical or fitness professionals can assess a subject's Barix and body type and suggest lifestyle changes to help each subject towards their optimal Barix.

A subject's Barix has strong (negative) correlation to the subject's circumferential waist measurement and circumferential hip measurement, but weak correlation to the subject's waist-to-hip ratio (a traditional indicator) or the subject's torso height. In general, the smaller the waist and/or hip measurement, the larger the subject's Barix. This makes intuitive sense, as thinner subjects generally have a higher Barix.

The low degree of correlation (relative independence) between a subject's Barix and waist-to-hip ratio is beneficial since it has been shown that the waist-to-hip ratio can be a misleading aesthetic indicator.

The low degree of correlation (relative independence) between a subject's Barix and torso height is beneficial since many subjects may have the same torso height, but subjects with the same torso height are unlikely to have the same (volume/surface area) product.

Table 10 shows correlations between the Barix, waist and hip measurements, waist-to-hip ratio, and torso height for the sample population.

TABLE 10

Correlation values between the Barix, waist and hip measurements, waist-to-hip ratio, and torso height for sample population

|  | Waist | Hips | Waist-to-Hip Ratio | Barix | Torso Height |
|---|---|---|---|---|---|
| waist | 1 | | | | |
| hips | 0.874692 | 1 | | | |
| waist-to-hip ratio | 0.735066 | 0.320518 | 1 | | |
| Barix | −0.77236 | −0.786 | −0.41706861 | 1 | |
| torso height | 0.264922 | 0.142504 | 0.342166981 | 0.307661 | 1 |

Table 10 indicates that the correlation between the Barix and the waist measurement is −0.772. The correlation between the Barix and the hip measurement is −0.786. These values indicate a high degree of negative correlation.

In contrast, the correlation between the Barix and the waist-to-hip ratio is −0.417. The correlation between the Barix and the torso height is 0.308. These values are insufficient to declare any dependencies.

In various exemplary embodiments, specialized Barix scales may be developed for subjects in particular classifications that do not easily merge into the generalized Barix scale, such as, for example, pediatric, geriatric, obstetric, morbidly obese, problematically thin, or other subjects. Additionally, specialized Barix scales may be developed for certain medical disciplines. These specialized Barix scales categorize the degree of adiposity of specific subjects of interest within a particular category or medical discipline. Specialized Barix scales are needed because inclusion of the Barix numbers of the subjects within a specialized Barix scale would skew the generalized Barix scale.

It should be appreciated that a specialized Barix scale may or may not be a subset of the generalized Barix scale. A specialized pediatric index, for instance, is not a subset of the generalized Barix scale as the generalized Barix scale is composed of Barix calculations for adults. The bariatric index is applied to morbidly obese subjects undergoing bariatric Surgery. As they lose mass, the subjects that have undergone some form of bariatric Surgery may move out of the bariatric index and into the generalized Barix scale. The geriatric index is a specialized Barix scale designed to interpret an elderly subject's Barix to elderly peers. The anorexic index is a specialized Barix scale designed to interpret an anorexic subject's Barix within a population of anorexic subjects.

It should be understood that the specialized Barix scales, with the exception of the pediatric index, may be interpreted against the generalized Barix scale to gauge where the subject's Barix stands in comparison with the overall population sample.

In one non-limiting embodiment, an exemplary bariatric index, which is a specialized Barix scale, has been created from a sample of 13 pre-operative bariatric surgery candidates. For exemplary purposes, 13 data from 13 pre-operative bariatric surgery candidates provides for a general outline of the principles and utility of a general or generalized Barix scale. It should be appreciated that as additional samples are added to an exemplary specialized Barix scale, the specialized Barix scale can be modified or calibrated as needed.

It should also be appreciated that the exemplary specialized Barix scale is for a basic explanation and understanding of the operation of the systems and methods of this invention. Therefore, the exemplary specialized Barix scale is not to be construed as limiting the systems and methods of this invention.

A pre-operative torso height, torso volume, and torso surface area were recorded and a Barix was calculated for each of the 13 bariatric subjects, according to the methods outlined herein. Table 11 summarizes the pre-operative Barix information for the 13 bariatric subjects.

TABLE 11

Pre-operative bariatric subjects and Barix information

| Torso Height | Torso Volume | Torso Surface Area | Barix |
|---|---|---|---|
| 69 | 86965 | 9023 | 7.159 |
| 67 | 91777 | 9367 | 6.839 |
| 61 | 70770 | 7623 | 6.57 |
| 67 | 94716 | 9270 | 6.557 |
| 60 | 85650 | 8384 | 5.873 |
| 64 | 81902 | 8356 | 6.529 |
| 68 | 119341 | 10427 | 5.941 |
| 70 | 108098 | 10231 | 6.629 |
| 87 | 160265 | 13829 | 7.507 |
| 85 | 185814 | 14206 | 6.575 |
| 80 | 117615 | 11441 | 7.782 |
| 68 | 89843 | 9129 | 6.92 |
| 89 | 162356 | 14102 | 7.731 |

As shown in Table 11, the Barix for each bariatric subject is near or below the indicator on the preliminary generalized Barix scale (Table 9) for morbid obesity.

Table 12 depicts this information in rank and percentile format.

TABLE 12

Pre-operative bariatric Subject Population Rank and Percentile

| Point | Barix | Rank | Percent |
|---|---|---|---|
| 11 | 7.782 | 1 | 100.00% |
| 13 | 7.731 | 2 | 91.60% |
| 9 | 7.507 | 3 | 83.30% |
| 1 | 7.159 | 4 | 75.00% |
| 12 | 6.92 | 5 | 66.60% |
| 2 | 6.839 | 6 | 58.30% |
| 8 | 6.629 | 7 | 50.00% |
| 10 | 6.575 | 8 | 41.60% |
| 3 | 6.57 | 9 | 33.30% |
| 4 | 6.557 | 10 | 25.00% |
| 6 | 6.529 | 11 | 16.60% |
| 7 | 5.941 | 12 | 8.30% |
| 5 | 5.873 | 13 | .00% |

Table 13 summarizes and defines the exemplary bariatric index. The main purpose of the bariatric index is to produce various categorizations of the Barix for morbidly obese subjects. This index is designed to assist the bariatric surgeon, for example, in determining the degree of obesity of morbidly obese subjects. This can be of great assistance in determining whether a subject can proceed directly to bariatric surgery or must be placed on a restricted calorie diet until the subject's Barix rises to a particular value.

It should be understood that the exemplary bariatric index can be calibrated as additional subjects enter the sample population. Barix cut-off points will undoubtedly adjust, but the concept remains constant.

TABLE 13

The exemplary bariatric index

| Percentile | Barix | Description |
|---|---|---|
| 100 | 7.783 to 7.159 | Suitable for Surgery |
| Below 75 | 7.158 to 6.630 | Less Surgical Risk |
| Below 50 | 6.629 to 6.558 | Some Surgical Risk |
| Below 25 | 6.557 or less | Unsuitable for Surgery |

In various exemplary embodiments, those subjects with a Barix of below 6.557 are considered unsuitable for surgery by a bariatric surgeon and are placed on a calorie-restricted diet for at least 60 days.

Those subjects with a Barix of 6.629 to 6.558 were considered to have some surgical risk by the bariatric surgeon and are placed on a calorie-restricted diet for at least 30 days.

Those subjects with a Barix of 7.158 to 6.630 were considered to be of less surgical risk by the bariatric surgeon. The bariatric surgeon, in those cases, made a determination to operate based on other health indications and medical history, or recommended a calorie restricted diet for less than 30 days.

Those subjects with a Barix of greater than 7.159 were considered immediate surgical candidates, provided that their overall health and medical history permitted the bariatric surgical procedure.

Other specialized Barix scales can be developed in a similar manner. These include but are not limited to a pediatric index, a geriatric index, an obstetric index, and an anorexic index.

A subject's Barix will change over time. This can be due to the normal effects of aging, or changes in the subject's lifestyle, such as a new diet or exercise regimen. Such changes to a subject's Barix are measurable. Dramatic changes to a subject's Barix in either a positive or a negative direction may be cause for concern if that subject is not participating in, for example, an exercise program, a severely calorie restricted diet, undergoing a surgical procedure that affects the physical contours of the body, or some other readily determinable factor.

Monitoring changes to a subject's Barix can assist a physician, surgeon, or other healthcare provider in evaluating post-operative recovery. Monitoring changes to a subject's Barix can also assist a fitness or nutrition professional in assessing the progress of a subject's change in lifestyle (diet, exercise, change in stress level, cessation from smoking, etc).

Each subject has their own Barix trajectory. The Barix trajectory is simply the direction or trend that a subject's Barix takes over time. If the subject's Barix is increasing slightly over time (positive), that subject is likely enjoying the results of a new exercise or diet regimen. If the subject's Barix decreases slightly over time (negative), it could indicate the normal aging process or a trend toward gaining weight.

Figure 15:
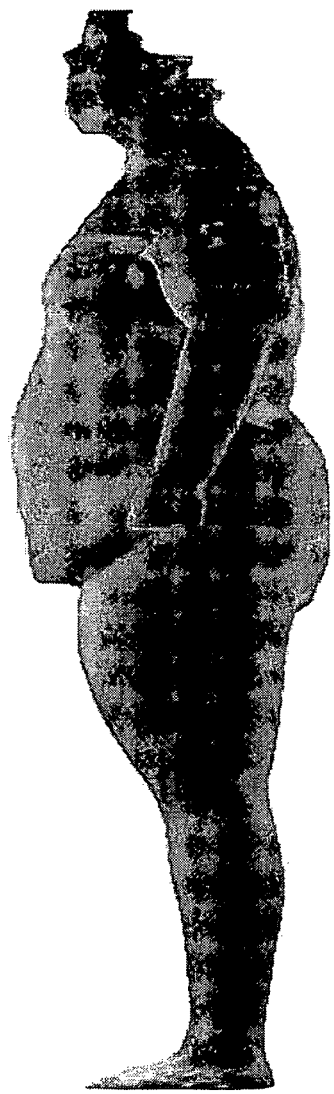
FIG. 15 shows an illustrative composite image of an exemplary subject's three-dimensional scan, according to this invention, wherein the scan image depicts a profile of a first pre-operative bariatric patient and the patient's 3-month post-operative scan image profile.
Figure 15:
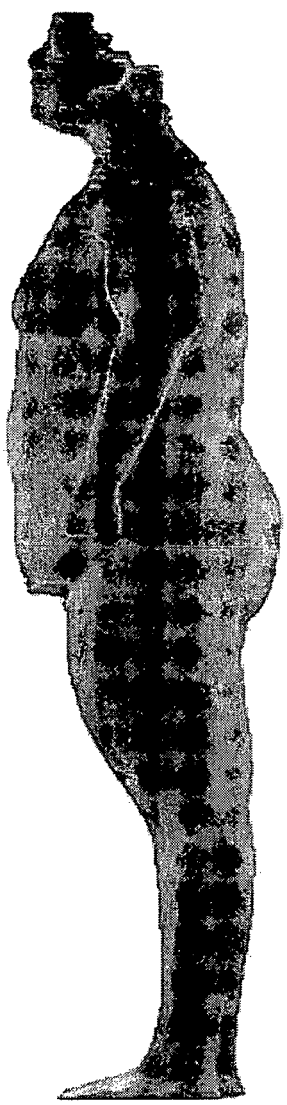
Figure 16:
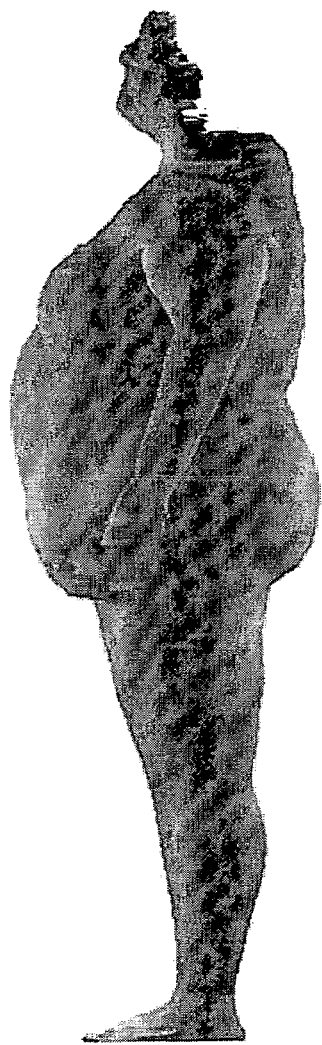
FIG. 16 shows an illustrative composite image of an exemplary subject's three-dimensional scan, according to this invention, wherein the scan image depicts a profile of a second pre-operative bariatric patient and the patient's 3-month post-operative scan image profile.
Figure 16:
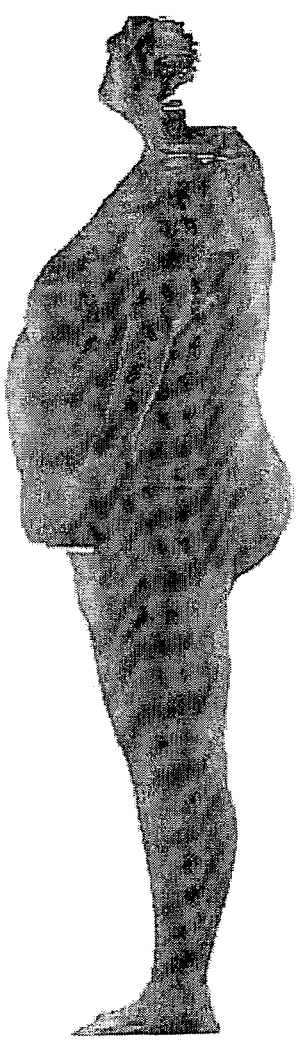

FIGS. 15 and 16 illustrate two exemplary, non-limiting embodiments of examples of interpreting a positive Barix trajectory. In both examples, the subject has undergone a bariatric surgical procedure. In both cases, a gastric bypass was performed.

It should be appreciated that these two examples of interpreting a positive Barix trajectory are for a basic explanation and understanding of the operation of the systems and methods of this invention. Therefore, the two examples are not to be construed as limiting the systems and methods of this invention and similar methods can be used to monitor the recovery process for subjects that have undergone surgical procedures intended to remove tissue. Such applications can include, but are not limited to, breast reduction, abdominoplasty, and lipoplasty (of the torso) surgical procedures.

FIG. 15 shows an illustrative composite image of an exemplary subject's three-dimensional scan, according to this invention, wherein the scan image depicts a profile of a first pre-operative bariatric patient and the patient's 3-month post-operative scan image profile. Table 14 displays the approximate torso height, torso volume, torso surface area, and Barix for the pre-operative and the 3-month post-operative scan images of the first pre-operative bariatric patient.

TABLE 14

Pre-operative and 3-month post-operative Barix information

| | Torso Height | Torso Volume | Torso Surface Area | Barix |
|---|---|---|---|---|
| Pre-op | 68.4(68) | 89843 | 9129 | 6.920 |
| 3 Mo Post | 68.7(69) | 8069 | 8069 | 7.963 |

Table 14 shows an improvement from a pre-operative Barix of 6.920 to a 3-month post-operative Barix of 7.963. When the 3-month post-operative Barix of 7.963 is compared to the generalized Barix scale (Table 9), the bariatric surgeon can declare that the post-operative subject has moved out of the morbidly obese body condition to an "improved" extremely obese body condition. In this case, the Barix trajectory is positive.

The rate of change of the subject's Barix is an additional measure of recovery. The Barix rate of change is defined as the change of the Barix between sequential periods of time divided by the time period, usually in months. In the example above, the subject's Barix rate of change is (7.963-6.920)/3 (months), or 0.35.

Each subject's Barix rate of change can be compared to other subjects that have undergone a similar bariatric surgical procedure. The larger the value, the more rapid the subject appears to be recovering (in this case "recover" is defined as weight loss).

FIG. 16 shows an illustrative composite image of an exemplary subject's three-dimensional scan, according to this invention, wherein the scan image depicts a profile of a second pre-operative bariatric patient and the patient's 3-month post-operative scan image profile. Table 15 displays the approximate torso height, torso volume, torso surface area, and Barix for the pre-operative and the 3-month post-operative scan images of the second pre-operative bariatric patient.

TABLE 15

Pre-operative and 3 Month Post-Operative Barix Information - Example #2

|         | Torso Height | Torso Volume | Torso Surface Area | Barix |
|---------|---|---|---|---|
| Pre-op  | 69 | 87179 | 8879 | 7.027 |
| 3 Mo Post | 69 | 80573 | 8648 | 7.406 |

Table 15 shows an improvement from the pre-operative Barix of 7.027 to a 3-month post-operative Barix of 7.406. This 3-month post-operative Barix, while improved, is still below the generalized Barix scale indicator for an extremely obese classification. The subject's Barix trajectory is positive.

The subject's Barix rate of change is (7.406-7.027)/3 (months), or 0.13. The second subject's Barix rate of change is less than the first subject's Barix rate of change. This indicates that the latter subject's recovery progress (as measured by weight loss) is slower than the former bariatric surgical subject example. There may be a number of reasons for this. This subject could be older or less active than the previous subject.

The bariatric surgeon can utilize this information to compare the recovery progress of this patient against the recovery rates of other patients in similar age groups to make a determination as to whether there are any medical conditions that might need to be addressed.

The Barix, Barix trajectory, and rate of change of the Barix can be calculated for each periodic scan. Eventually, sequential Barix rate of changes will decrease to a narrow band around a steady state point. The Barix trajectory may also in turn change its magnitude. At this stage, the post-operative subject that underwent a bariatric surgical procedure will have manifested the full effects of the surgical outcome. The optimal Barix range for this subject will have been reached.

This same approach can be used to monitor reduction of swelling from surgical procedures such as breast reduction, abdominoplasty, and lipoplasty (of the torso). These surgical procedures remove tissue or fat from the subject. There is considerable swelling immediately after these surgical procedures. The swelling reduces over a period of time, but not necessarily uniformly. Each patient recovers from surgery different than another.

Periodic post-operative scans, calculation of the Barix, Barix trajectory and the Barix rate of change can assist the surgeon in understanding the point in time that post-operative swelling has diminished, and the subject's torso reaches a "steady state".

Figure 17:
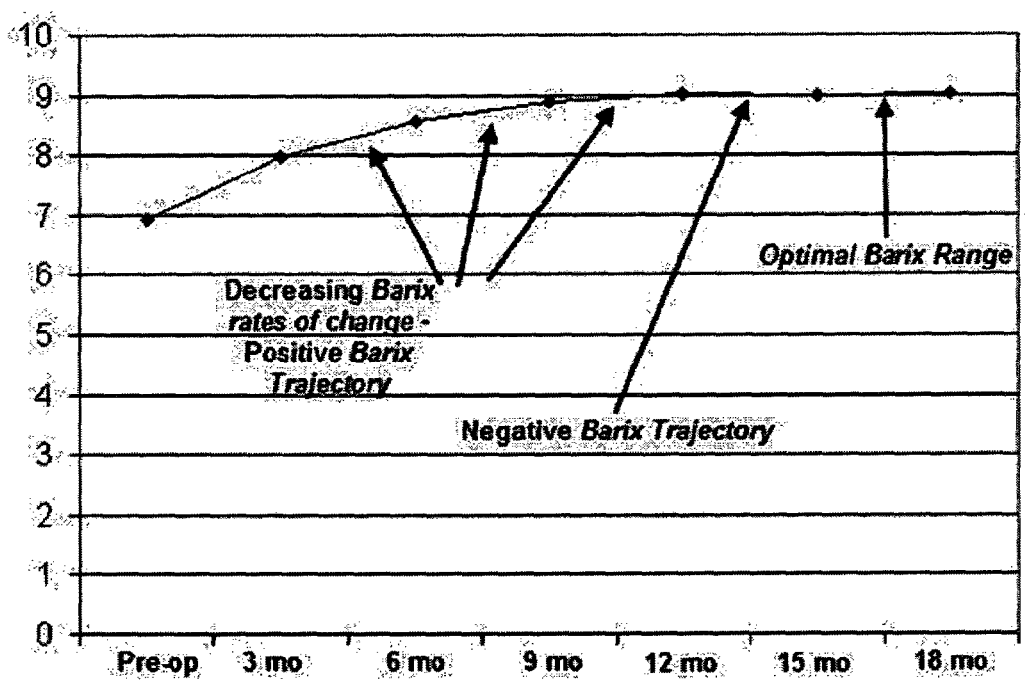
FIG. 17 shows a chart that graphically illustrates the Barix trajectory, Barix rate of change, and optimal Barix range for an exemplary subject, wherein the exemplary subject has undergone a bariatric surgical procedure.

FIG. 17 shows a chart that graphically illustrates the Barix trajectory, Barix rate of change, and optimal Barix range for an exemplary subject, wherein the exemplary subject has undergone a bariatric surgical procedure. More specifically, FIG. 17 depicts decreasing Barix rates of change between 3-month scan intervals. The Barix rate of change goes to zero and the Barix trajectory turns negative during the period between 12 months and 15 months. This indicates that the patient has fully manifested the results of the bariatric surgery.

The subject's Barix is then maintained in a narrow range. This narrow range is the optimal Barix for the particular subject. The optimal Barix range for a subject indicates a subject's "steady state Barix range". Deviation from the subject's optimal Barix range over a period of time may indicate a condition of concern for medical or fitness professionals.

Generally, a subject's subsequent descending Barix calculation and negative Barix trajectory indicates that the subject is gaining weight and/or the (torso volume/surface area) product is increasing.

There are circumstances in which a subject's descending Barix can occur suddenly, such as after a subject has undergone breast augmentation surgery. Alternatively, a subject's descending Barix can occur over a finite period of time, such as when an expectant mother goes through pregnancy.

Figure 18:
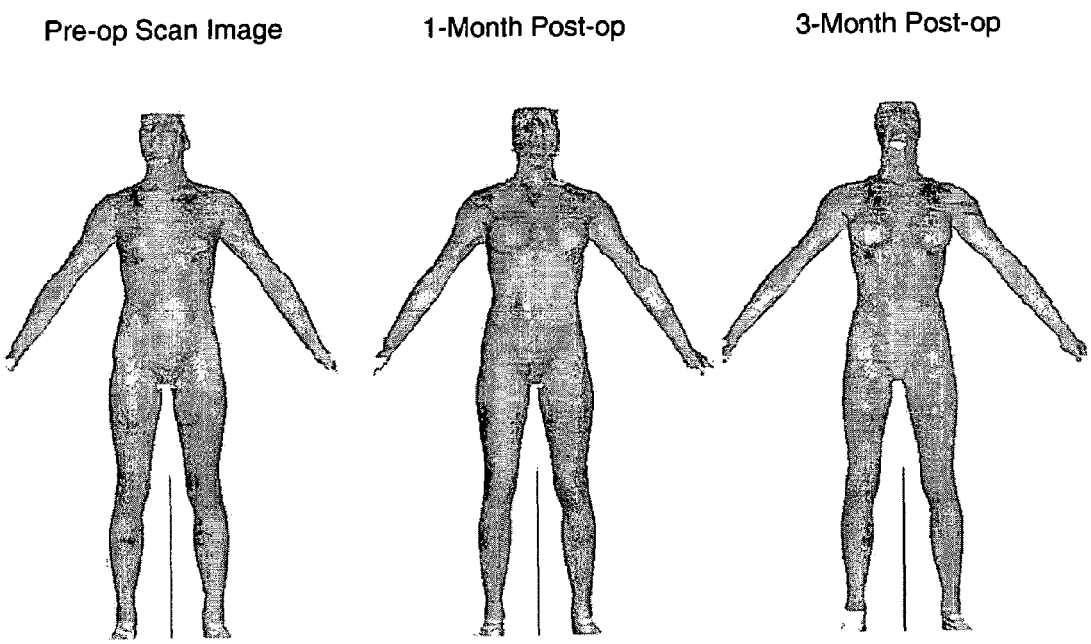
FIG. 18 shows a series of illustrative composite images of an exemplary subject, according to this invention, wherein the series of scans show the subject prior to a breast augmentation procedure, 1-month after undergoing the breast augmentation procedure, and 3-months after undergoing the breast augmentation procedure.

FIG. 18 shows a series of illustrative composite images of an exemplary subject, wherein the series of scans show the subject prior to a breast augmentation procedure, 1-month after undergoing the breast augmentation procedure, and 3-months after undergoing the breast augmentation procedure.

Breast augmentation is an invasive surgery whereby breast implants are placed within the subject's chest wall. Swelling of the chest area occurs immediately after surgery. Over a period of time, the swelling diminishes and the implants settle.

By utilizing the Barix, the Barix trajectory, and the Barix rate of change, a surgeon can determine when a subject's swelling has diminished and the breast implants have settled.

Table 16 displays the torso height, torso volume, torso surface area, and Barix for the pre-operative, 1 month, and the 3-month post-operative scan images of FIG. 18.

TABLE 16

Pre-operative, 1-month, and 3-Month post-operative Barix information - breast augmentation example

|         | Torso Height | Torso Volume | Torso Surface Area | Barix |
|---------|---|---|---|---|
| Pre-op  | 61 | 27510 | 5022 | 11.135 |
| 1 mo post | 61 | 28189 | 5044 | 10.915 |
| 3 mo post | 61 | 28010 | 5038 | 10.972 |

Figure 19:
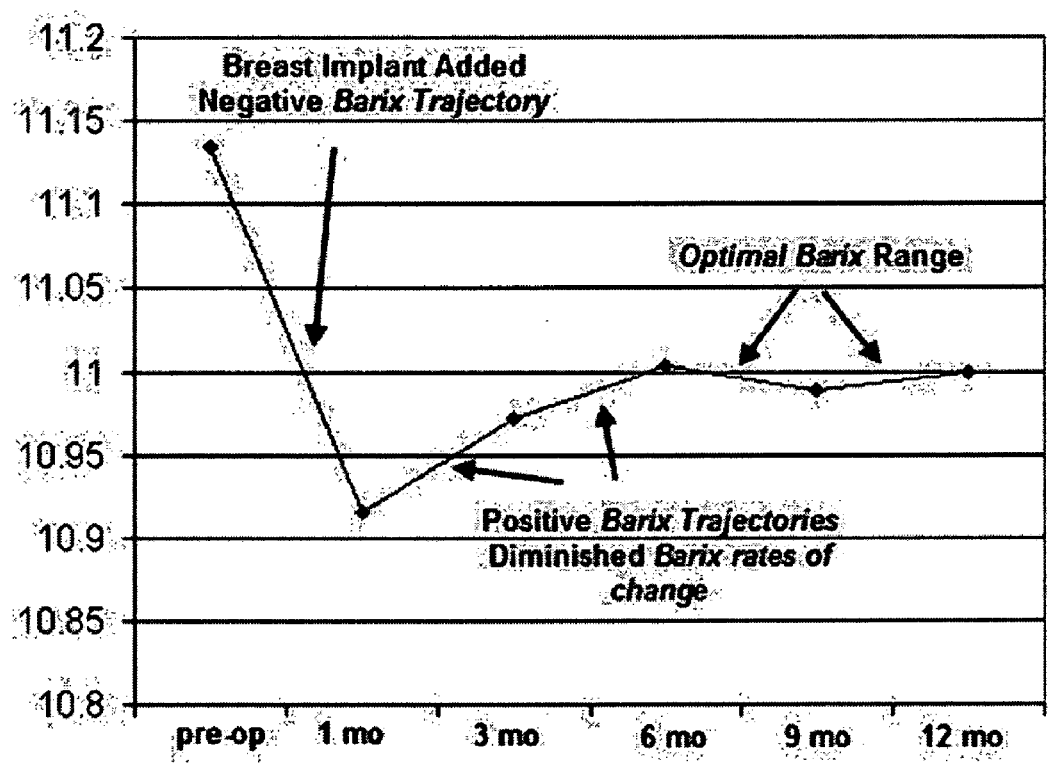
FIG. 19 shows a chart that graphically illustrates the Barix trajectory, Barix rate of change, and optimal Barix range for an exemplary subject, wherein the exemplary subject has undergone a breast augmentation surgical procedure.

FIG. 19 shows a chart that graphically illustrates the Barix trajectory, Barix rate of change, and optimal Barix range for the exemplary breast augmentation subject illustrated in FIG. 18.

Table 16 and FIG. 19 indicate that the exemplary breast augmentation subject's pre-operative Barix was 11.135. 1 month after breast augmentation surgery the subject's Barix was 10.915, reflecting the addition of the breast implants into the subject's torso. During this period, the exemplary breast augmentation subject had a negative Barix trajectory. The Barix rate of change was (11.135-10.915)/1 month, or 0.22.

The exemplary breast augmentation subject's 3 month post-operative Barix was 10.972. Between the 3-month post-operative scan and the 1-month post-operative scan, the subject's Barix trajectory changed from negative to positive. This indicates that the swelling has begun to abate. The Barix rate of change between the 3 month post-operative scan and the 1 month post-operative scan was (10.972-10.915)/2 months, or 0.03. This Barix rate of change is nearly zero, indicating the exemplary breast augmentation subject is reaching her optimal Barix range.

While this invention has been described in conjunction with the exemplary embodiments outlined above, it is evident that many alternatives, modifications, and variations will be apparent to those skilled in the art. Such adaptations and modifications should and are intended to be comprehended within the meaning and range of equivalents of the disclosed exemplary embodiments.

It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A method for quantifying a subject's degree of adiposity, comprising:
    receiving a scanned image of at least a portion of a subject's body;
    defining a torso portion of the scanned image;
    calculating a torso height for the defined torso portion;
    calculating a torso surface area for the defined torso portion;
    calculating a torso volume for the defined of the torso portion;
    dividing the torso height by a quotient of the torso volume and the torso surface area to quantify the subject's degree of adiposity as a Barix calculation; and
    displaying the subject's degree of adiposity as a Barix calculation.

2. The method of claim 1, wherein the scanned image is a dimensionally correct, 3D image of the subject's body.

3. The method of claim 1, wherein the torso portion of the subject's scanned image is defined as an area of the subject's scanned image between a base of a neck of the subject's scanned image, excluding a head of the subject's scanned image, and a crotch point of the subject's scanned image.

4. The method of claim 1, wherein the torso portion of the subject's scanned image is defined as an area of the subject's body between shoulder joint portions of the subject's scanned image and hip joint portions of the subject's scanned image.

5. The method of claim 1, wherein calculating the torso height, the torso surface area, and the torso volume of the torso portion comprises applying a Measurement Extraction Profile to the torso portion.

6. The method of claim 1, wherein the Barix calculation is dimensionless.

7. The method of claim 1, further comprising comparing the Barix calculation to a Barix scale.

8. The method of claim 7, wherein the Barix scale is a generalized Barix scale for comparing the Barix of the subject to a sample of an adult population.

9. The method of claim 7, wherein the Barix scale is a specialized Barix scale for comparing the Barix of the subject to a specific sample of a select population.

10. The method of claim 9, wherein the specialized Barix scale is selected based on a specific medical or physical condition of the subject.

11. The method of claim 7, wherein the Barix scale is a descending scale, such that the lower the Barix number, the more obese the subject.

* * * * *